United States Patent
Vander Lind et al.

(10) Patent No.: US 9,878,775 B2
(45) Date of Patent: Jan. 30, 2018

(54) DUAL-PITCH SUPPORT FOR A PROPELLER

(71) Applicant: X Development LLC, Mountain View, CA (US)

(72) Inventors: Damon Vander Lind, Alameda, CA (US); Geoff Dolan, San Francisco, CA (US)

(73) Assignee: X Development LLC, Mountain View, CA (US)

( * ) Notice: Subject to any disclaimer, the term of this patent is extended or adjusted under 35 U.S.C. 154(b) by 1147 days.

(21) Appl. No.: 14/143,414

(22) Filed: Dec. 30, 2013

(65) Prior Publication Data

US 2015/0183510 A1  Jul. 2, 2015

(51) Int. Cl.
*B64C 11/34* (2006.01)
*F03D 7/02* (2006.01)
*F03D 5/00* (2006.01)

(52) U.S. Cl.
CPC .............. *B64C 11/343* (2013.01); *F03D 5/00* (2013.01); *F03D 7/0224* (2013.01); *F05B 2240/917* (2013.01); *F05B 2240/921* (2013.01); *Y02E 10/70* (2013.01); *Y02E 10/723* (2013.01); *Y02E 10/728* (2013.01)

(58) Field of Classification Search
CPC ..... B64C 11/343; B64C 11/06; F03D 7/0224; F03D 1/0691; F05B 2270/328
See application file for complete search history.

(56) References Cited

U.S. PATENT DOCUMENTS

| | | | |
|---|---|---|---|
| 1,973,046 A * | 9/1934 | Brooks | B64C 11/36 116/303 |
| 2,117,062 A * | 5/1938 | Jablonsky | B64C 11/343 416/167 |
| 2,246,539 A * | 6/1941 | Ruths | B63H 3/008 416/136 |
| 2,435,360 A | 2/1948 | Leiner | |
| 2,646,131 A | 7/1953 | Mergen et al. | |
| 2,888,992 A | 6/1959 | Hendrix et al. | |
| 6,672,835 B1 | 1/2004 | Hughes | |

(Continued)

OTHER PUBLICATIONS

International Preliminary Report on Patentability issued in co-pending International Application No. PCT/US2014/070918, International Bureau of WIPO, dated Jul. 5, 2016, 6 pages.

*Primary Examiner* — Gregory Anderson
*Assistant Examiner* — Juan G Flores
(74) *Attorney, Agent, or Firm* — McDonnell Boehnen Hulbert & Berghoff LLP

(57) ABSTRACT

Apparatus are disclosed that are configured to passively rotate a propeller blade from a first pitch angle to a second pitch angle. An example apparatus involves: (a) a rotor hub, (b) at least one dual-pitch support coupled to the rotor hub, wherein the dual-pitch support has a first surface, a second surface and a cavity defined there between, and (c) at least one propeller blade rotatably coupled to the rotor hub such that a blade root is disposed within the dual-pitch support's cavity, where the blade root's front face is positioned against the dual-pitch support's first surface in a first position and the blade root's back face is positioned against the dual-pitch support's second surface in a second position, and the propeller blade is oriented at a first pitch angle in the first position and is oriented at a second pitch angle in the second position.

16 Claims, 17 Drawing Sheets

(56) References Cited

U.S. PATENT DOCUMENTS

| | | |
|---|---|---|
| 7,571,013 B2 | 8/2009 | Altemark |
| 8,016,544 B1 * | 9/2011 | Nguyen ................. F03D 3/067 |
| | | 415/130 |
| 2008/0159863 A1 | 7/2008 | Uphues |
| 2011/0076142 A1 | 3/2011 | Veldkamp et al. |
| 2011/0211957 A1 | 9/2011 | Folsom et al. |
| 2012/0027592 A1 | 2/2012 | Kinzie et al. |

* cited by examiner

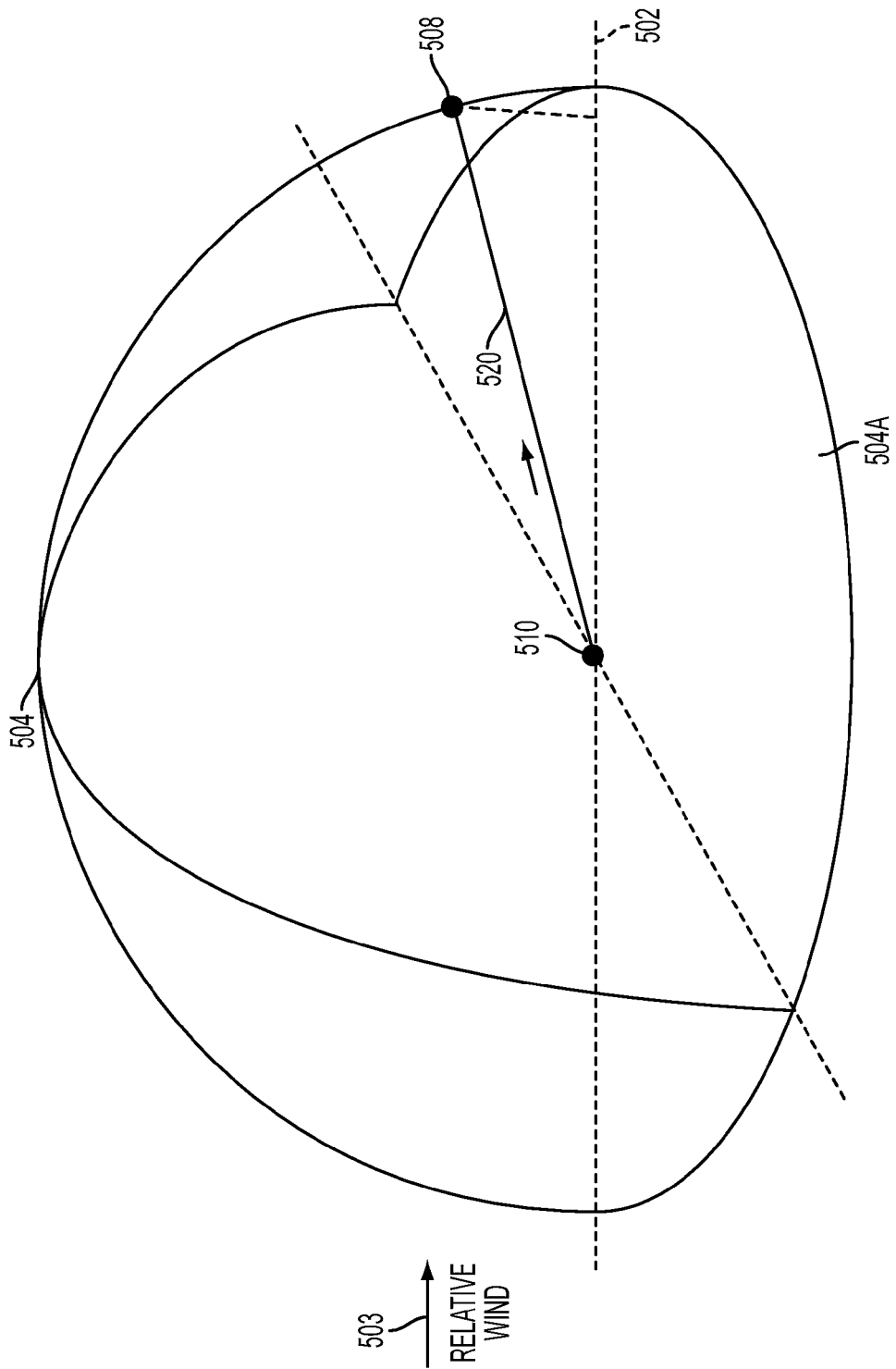

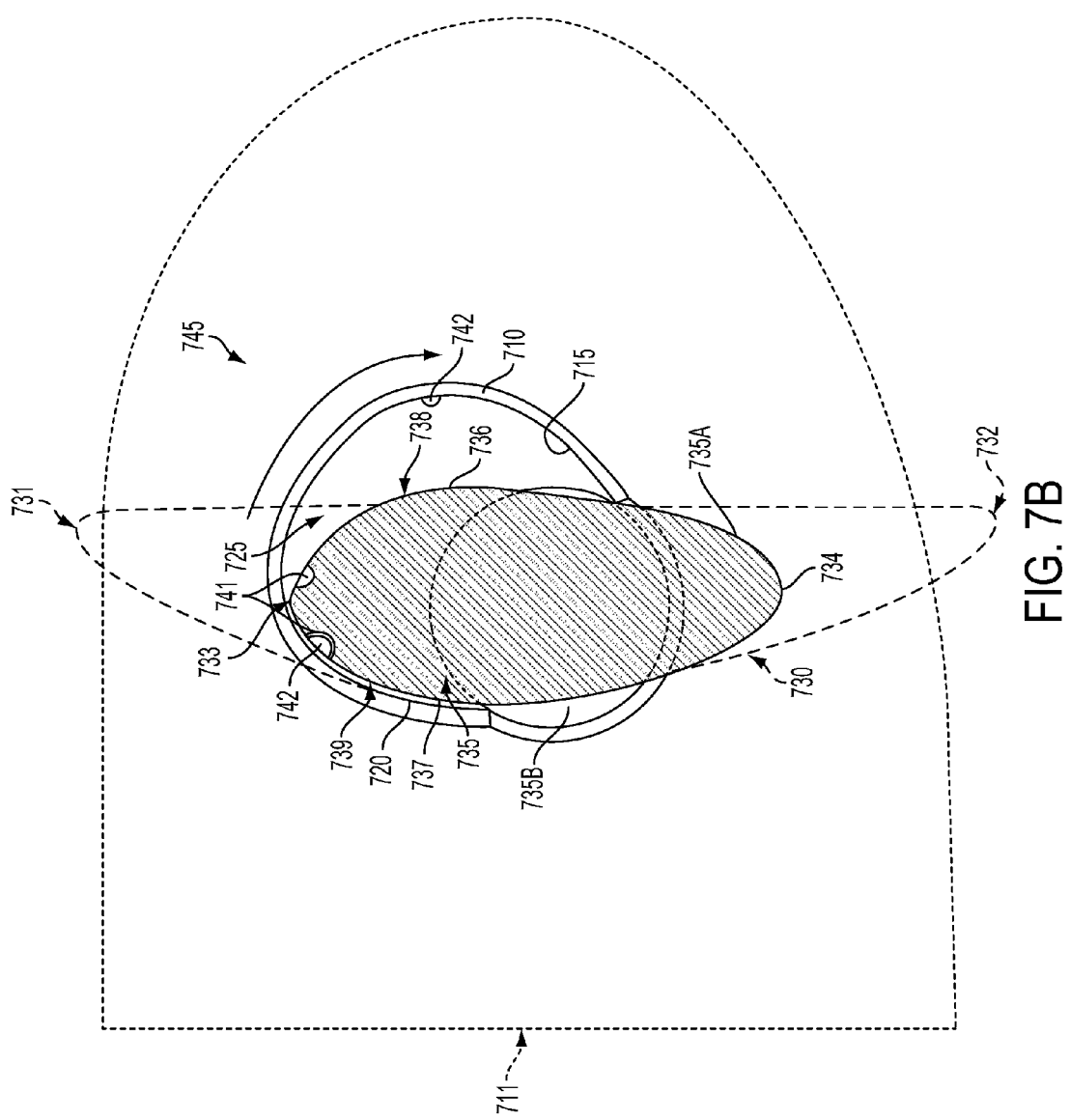

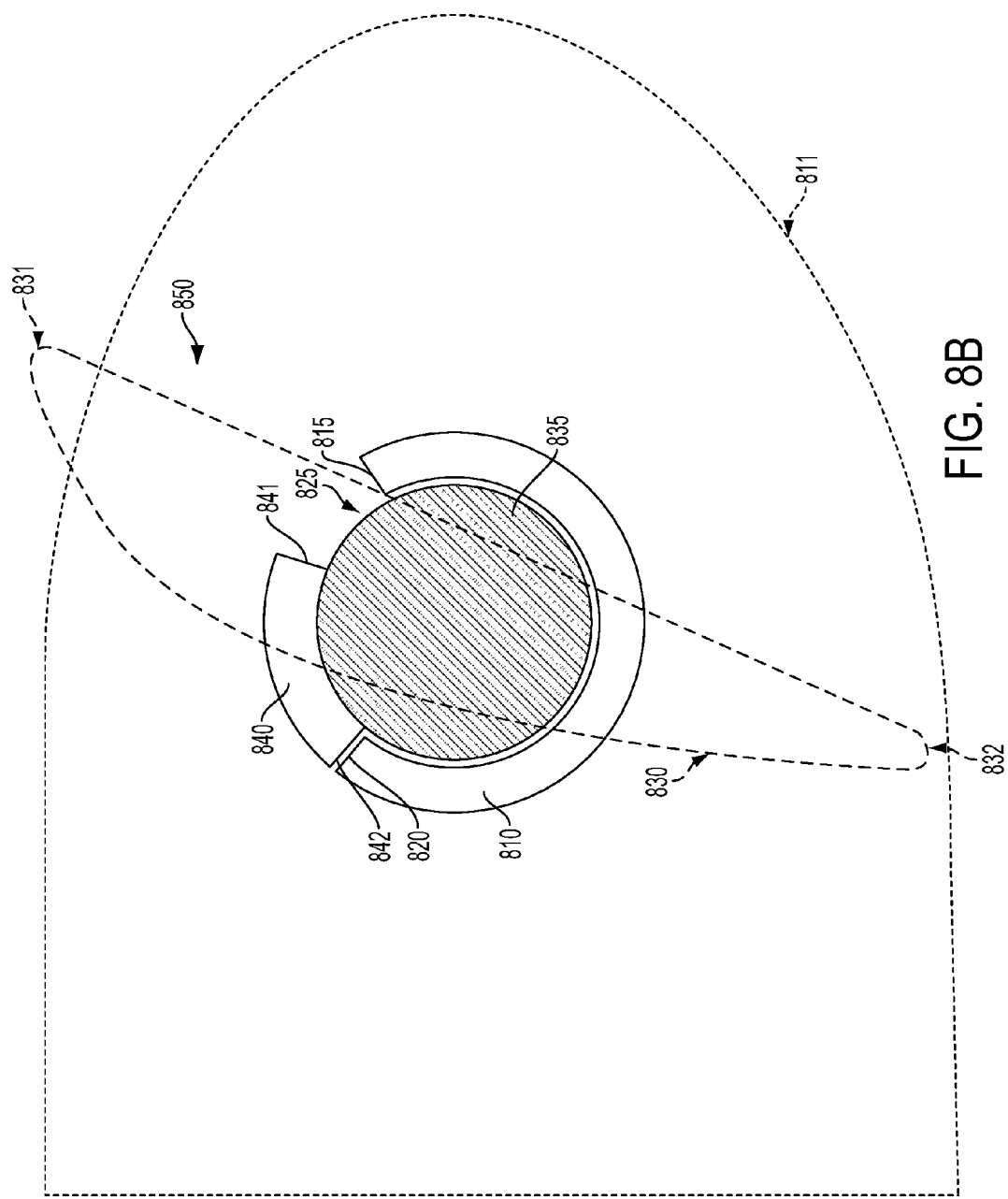

DUAL-PITCH SUPPORT FOR A PROPELLER

BACKGROUND

Unless otherwise indicated herein, the materials described in this section are not prior art to the claims in this application and are not admitted to be prior art by inclusion in this section.

Power generation systems may convert chemical and/or mechanical energy (e.g., kinetic energy) to electrical energy for various applications, such as utility systems. As one example, a wind energy system may convert kinetic wind energy to electrical energy.

SUMMARY

Methods and apparatus for passively changing, or assisting in changing, the pitch angle of propeller blades between certain flight modes that facilitate conversion of kinetic energy to electrical energy are described herein. More specifically, example embodiments generally relate to a dual-pitch support that provides for manual or passive transition of the propeller blades from a low pitch angle to a high pitch angle, and vice versa, in response to at least one or more forces resulting from an aerial vehicle changing flight modes. Beneficially, embodiments described herein may increase efficiency of the aerial vehicle. Further, embodiments described herein for passive pitch controllers may have an increased operational lifetime compared to continuously-variable pitch controllers.

In one aspect, an example apparatus involves: (a) a rotor hub, (b) at least one dual-pitch support coupled to the rotor hub, wherein the at least one dual-pitch support has a first surface, a second surface and a cavity defined between the first surface and the second surface, and (c) at least one propeller blade rotatably coupled to the rotor hub, wherein the at least one propeller blade includes a blade root disposed within the cavity of the at least one dual-pitch support, wherein a front face of the blade root is positioned against the first surface of the at least one dual-pitch support in a first position and a back face of the blade root is positioned against the second surface of the dual-pitch support in a second position, and wherein the at least one propeller blade is oriented at a first pitch angle in the first position and is oriented at a second pitch angle in the second position.

In another aspect, an example apparatus involves: (a) a rotor hub, (b) at least one dual-pitch support coupled to the rotor hub, wherein the at least one dual-pitch support has a first surface, a second surface and a cavity defined between the first surface and the second surface, and (c) at least one propeller blade rotatably coupled to the rotor hub, wherein the propeller blade includes a blade root and at least one protuberance extending radially from the blade root, wherein the at least one protuberance is arranged within the cavity defined between the first surface and the second surface of the at least one dual-pitch support, wherein the at least one protuberance defines a first shoulder and the second shoulder, wherein the first shoulder of the at least one protuberance is positioned against the first surface of the at least one dual-pitch support in a first position and a second shoulder of the at least one protuberance is positioned against the second surface of the at least one dual-pitch support in a second position, and wherein the at least one propeller blade is oriented at a first pitch angle in the first position and is oriented at a second pitch angle in the second position.

In a further aspect, an apparatus is provided having a rotor hub, at least one propeller blade and means for causing the propeller blade to switch between a first pitch angle and a second pitch angle.

In yet another aspect, an example method involves: (a) operating a propeller system in a first mode, wherein the propeller system comprises a plurality of propeller blades each oriented at a first pitch angle, wherein a first force acts on the propeller blades as a result of operating in the first mode and maintains the propeller blades at the first pitch angle, (b) transitioning the propeller system from the first mode to a second mode, wherein a second force acts on the propeller blades as a result of operating in the second mode, wherein at least the second force causes the plurality of propeller blades to rotate to a second pitch angle, and (c) operating a propeller system in the second mode, wherein the second force maintains the propeller blades at the second pitch angle.

In a still further aspect, a non-transitory computer readable medium is provided having stored therein instructions executable by a computing device to cause the computing device to perform functions comprising (a) operating a propeller system in a first mode, wherein the propeller system comprises a plurality of propeller blades each oriented at a first pitch angle, wherein a first force acts on the propeller blades as a result of operating in the first mode and maintains the propeller blades at the first pitch angle, (b) transitioning the propeller system from the first mode to a second mode, wherein a second force acts on the propeller blades as a result of operating in the second mode, wherein at least the second force causes the plurality of propeller blades to rotate to a second pitch angle, and (c) operating a propeller system in the second mode, wherein the second force maintains the propeller blades at the second pitch angle.

These as well as other aspects, advantages, and alternatives, will become apparent to those of ordinary skill in the art by reading the following detailed description, with reference where appropriate to the accompanying drawings.

BRIEF DESCRIPTION OF THE FIGURES

FIGS. 5a and 5b depict a tether sphere, according to an example embodiment.

FIG. 7B is a cross-sectional end view of a dual-pitch support and propeller blade, according to the example embodiment of FIG. 7A, with the propeller blade positioned at a second pitch angle.

FIG. 8B is a cross-sectional end view of a dual-pitch support and propeller blade, according to the example embodiment of FIG. 8A, with the propeller blade positioned at a second pitch angle.

DETAILED DESCRIPTION

Figure 1:
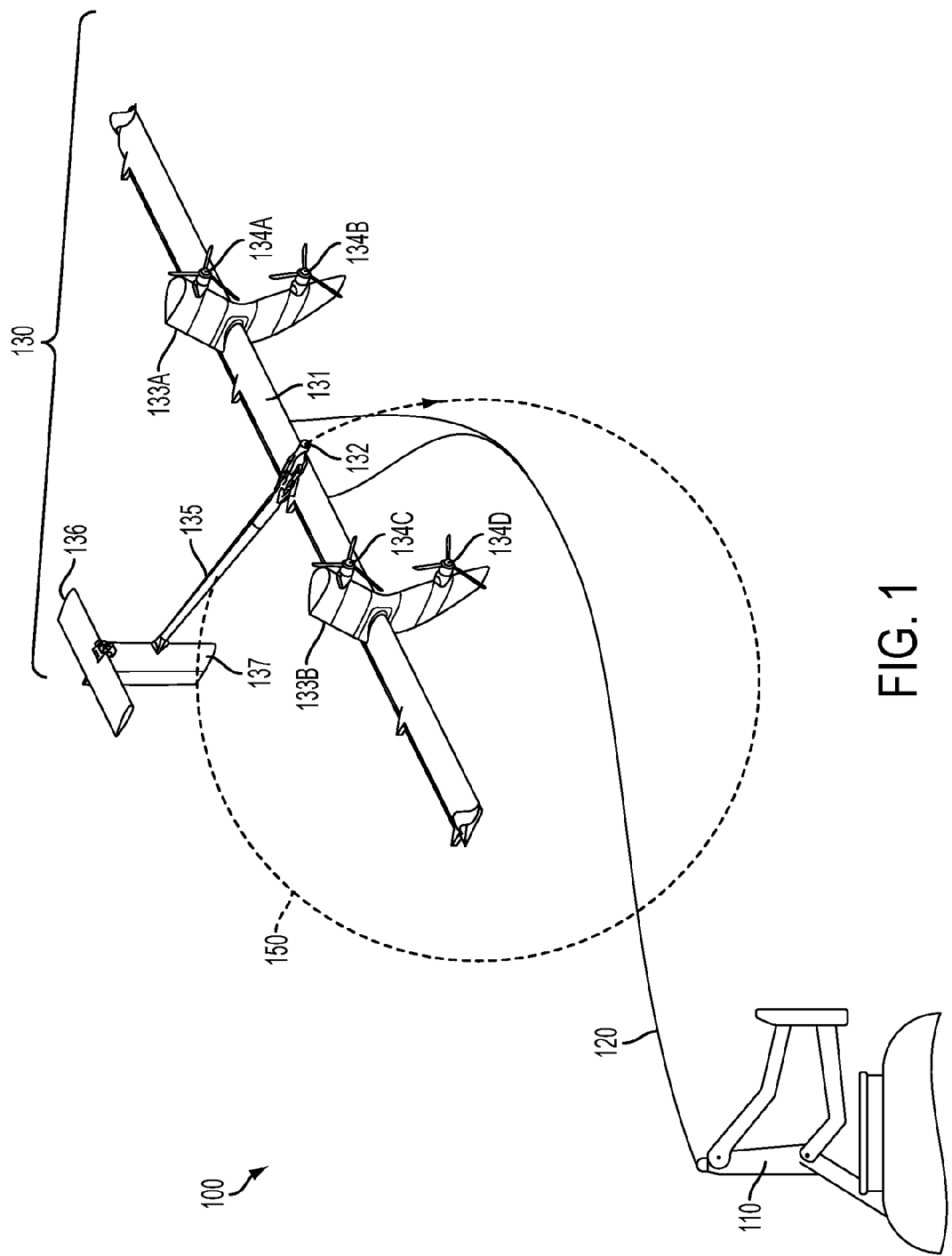
FIG. 1 depicts an Airborne Wind Turbine (AWT), according to an example embodiment.

Exemplary methods and systems are described herein. It should be understood that the word "exemplary" is used herein to mean "serving as an example, instance, or illustration." Any embodiment or feature described herein as "exemplary" or "illustrative" is not necessarily to be construed as preferred or advantageous over other embodiments or features. More generally, the embodiments described herein are not meant to be limiting. It will be readily understood that certain aspects of the disclosed methods systems and can be arranged and combined in a wide variety of different configurations, all of which are contemplated herein.

I. OVERVIEW

Example embodiments herein generally relate to a dual-pitch support that provides for manual, passive, or semi-passive transition of the propeller blades from a low pitch angle to a high pitch angle in response to at least a force resulting from an aerial vehicle changing flight modes. For example, when an aerial vehicle transitions from a hover or take-off mode to a forward flight or power generation mode, the direction of airflow acting upon the propeller blades may change and/or the profile of the air pressure gradients acting on the propeller blades may shift. In an aerial vehicle equipped with the disclosed dual-pitch support, the changing airflow or pressure gradients, as well as inertial or centripetal loads, may be harnessed to cause the propeller blades to rotate from a low pitch to a high pitch or vice versa. Additionally or alternatively, the aerial vehicle may generate a pulse of torque (e.g., a momentary change in torque such as an increase or decrease in torque over a short duration of time) via a motor that also causes the propellers to rotate between a low pitch angle and a high pitch angle or vice versa.

The ability to change pitch between the low pitch angle to the high pitch angle is the result of a dual-pitch support that permits the propeller blades to move between a first position and a second position, where the propeller blades has are oriented at a low pitch angle in the first position and oriented at a high pitch angle in the second position. Each propeller blade may be rotatably coupled to a rotor hub via, for example, a bearing or ball and socket joint, permitting rotation from the low pitch angle to the high pitch angle. The rotor hub may include a cavity defined by a dual-pitch support for each propeller blade. Each propeller blade may include an eccentric blade root, and the blade root may be disposed within the cavity defined by the dual-pitch support. The dual-pitch support may have a first surface associated with the low pitch angle and second surface associated with the high pitch angle. In the hover mode, for example, a front face of each propeller blade root may lie against the first surface of the dual-pitch support and the propeller blade may correspondingly be oriented at the low pitch angle. The propeller blade and blade root may be restrained from rotating away from the low pitch angle and the first surface, respectively, by pressure on the propeller blade resulting from the direction and force of air flow associated with the hover mode, or from some other force(s), or from a combination of the direction and force of air flow and some other force(s).

The aerial vehicle may transition from hover mode to a forward flight mode and a second force, resulting from a new flight direction or magnitude of airflow, may then act upon the propeller blades. This second force may cause the propeller blades to rotate with respect to the dual-pitch support such that a back face of each propeller blade may lie against the second surface of the dual-pitch support and the propeller blade may correspondingly be oriented at the high pitch angle. The second force may not be the only force acting to rotate the propeller blades, and other forces in addition to the second force may assist in the rotation. The propeller blade and blade root may be restrained from rotating away from the high pitch angle and the second surface, respectively, by pressure on the propeller blade resulting from the direction and force of airflow associated with the forward flight mode, or some other force(s), or from a combination of the direction and force of air flow and some other force(s).

Additionally or alternatively, the dual-pitch support may apply mechanical pressure to the eccentric blade root to constrain it, within a defined range of rotational force, from rotating away from either or both the first surface and/or the second surface. For example, the first surface and/or second surface of the dual-pitch support may include a detent that constrains the eccentric blade root up to some threshold value of rotational force acting to rotate the dual-pitch support away from the respective surface. Similarly, the eccentric blade root may include a detent that is constrained up to some threshold value of rotational force by a protrusion in the first and/or second surface of the dual-pitch support.

In an alternative embodiment, in a hover mode with the propeller blades in a first position and having a low pitch angle, a first shoulder of a radially extending protuberance on each propeller root may lie against the first surface of the dual-pitch support. When the aerial vehicle transitions from forward flight mode, the airflow forces acting on the propeller may change, causing the propeller blade and root to rotate such that a second shoulder of the protuberance moves adjacent the second surface of the dual-pitch support and the propellers assume a high pitch angle.

Accordingly, the invention beneficially provides passive pitch control resulting in longer lifespan than known continuously-variable pitch controllers.

II. ILLUSTRATIVE SYSTEMS

A. Airborne Wind Turbine (AWT)

FIG. 1 depicts an AWT 100, according to an example embodiment. In particular, the AWT 100 includes a ground station 110, a tether 120, and an aerial vehicle 130. As shown in FIG. 1, the aerial vehicle 130 may be connected to the tether 120, and the tether 120 may be connected to the ground station 110. In this example, the tether 120 may be attached to the ground station 110 at one location on the ground station 110, and attached to the aerial vehicle 130 at two locations on the aerial vehicle 130. However, in other examples, the tether 120 may be attached at multiple locations to any part of the ground station 110 and/or the aerial vehicle 130.

The ground station 110 may be used to hold and/or support the aerial vehicle 130 until it is in an operational mode. The ground station 110 may also be configured to allow for the repositioning of the aerial vehicle 130 such that deploying of the device is possible. Further, the ground station 110 may be further configured to receive the aerial vehicle 130 during a landing. The ground station 110 may be formed of any material that can suitably keep the aerial vehicle 130 attached and/or anchored to the ground while in hover flight, forward flight, crosswind flight. In some implementations, a ground station 110 may be configured for use on land. However, a ground station 110 may also be implemented on a body of water, such as a lake, river, sea, or ocean. For example, a ground station could include or be arranged on a floating off-shore platform or a boat, among other possibilities. Further, a ground station 110 may be configured to remain stationary or to move relative to the ground or the surface of a body of water.

In addition, the ground station 110 may include one or more components (not shown), such as a winch, that may vary a length of the tether 120. For example, when the aerial vehicle 130 is deployed, the one or more components may be configured to pay out and/or reel out the tether 120. In some implementations, the one or more components may be configured to pay out and/or reel out the tether 120 to a predetermined length. As examples, the predetermined length could be equal to or less than a maximum length of the tether 120. Further, when the aerial vehicle 130 lands in the ground station 110, the one or more components may be configured to reel in the tether 120.

The tether 120 may transmit electrical energy generated by the aerial vehicle 130 to the ground station 110. In addition, the tether 120 may transmit electricity to the aerial vehicle 130 in order to power the aerial vehicle 130 for takeoff, landing, hover flight, and/or forward flight. The tether 120 may be constructed in any form and using any material which may allow for the transmission, delivery, and/or harnessing of electrical energy generated by the aerial vehicle 130 and/or transmission of electricity to the aerial vehicle 130. The tether 120 may also be configured to withstand one or more forces of the aerial vehicle 130 when the aerial vehicle 130 is in an operational mode. For example, the tether 120 may include a core configured to withstand one or more forces of the aerial vehicle 130 when the aerial vehicle 130 is in hover flight, forward flight, and/or crosswind flight. The core may be constructed of any high strength fibers. In some examples, the tether 120 may have a fixed length and/or a variable length. For instance, in at least one such example, the tether 120 may have a length of 140 meters.

The aerial vehicle 130 may be configured to fly substantially along a path 150 to generate electrical energy. The term "substantially along," as used in this disclosure, refers to exactly along and/or one or more deviations from exactly along that do not significantly impact generation of electrical energy as described herein and/or transitioning an aerial vehicle between certain flight modes as described herein.

The aerial vehicle 130 may include or take the form of various types of devices, such as a kite, a helicopter, a wing and/or an airplane, among other possibilities. The aerial vehicle 130 may be formed of solid structures of metal, plastic and/or other polymers. The aerial vehicle 130 may be formed of any material which allows for a high thrust-to-weight ratio and generation of electrical energy which may be used in utility applications. Additionally, the materials may be chosen to allow for a lightning hardened, redundant and/or fault tolerant design which may be capable of handling large and/or sudden shifts in wind speed and wind direction. Other materials may be possible as well.

The path 150 may be various different shapes in various different embodiments. For example, the path 150 may be substantially circular. And in at least one such example, the path 150 may have a radius of up to 265 meters. The term "substantially circular," as used in this disclosure, refers to exactly circular and/or one or more deviations from exactly circular that do not significantly impact generation of electrical energy as described herein. Other shapes for the path 150 may be an oval, such as an ellipse, the shape of a jelly bean, the shape of the number of 8, etc.

As shown in FIG. 1, the aerial vehicle 130 may include a main wing 131, a front section 132, rotor connectors 133A-B, rotors 134A-D, a tail boom 135, a tail wing 136, and a vertical stabilizer 137. Any of these components may be shaped in any form which allows for the use of components of lift to resist gravity and/or move the aerial vehicle 130 forward.

The main wing 131 may provide a primary lift for the aerial vehicle 130. The main wing 131 may be one or more rigid or flexible airfoils, and may include various control surfaces, such as winglets, flaps, rudders, elevators, etc. The control surfaces may be used to stabilize the aerial vehicle 130 and/or reduce drag on the aerial vehicle 130 during hover flight, forward flight, and/or crosswind flight.

The main wing 131 may be any suitable material for the aerial vehicle 130 to engage in hover flight, forward flight, and/or crosswind flight. For example, the main wing 131 may include carbon fiber and/or e-glass. Moreover, the main wing 131 may have a variety dimensions. For example, the main wing 131 may have one or more dimensions that correspond with a conventional wind turbine blade. As another example, the main wing 131 may have a span of 8 meters, an area of 4 meters squared, and an aspect ratio of 15. The front section 132 may include one or more components, such as a nose, to reduce drag on the aerial vehicle 130 during flight.

The rotor connectors 133A-B may connect the rotors 134A-D to the main wing 131. In some examples, the rotor connectors 133A-B may take the form of or be similar in form to one or more pylons. In this example, the rotor connectors 133A-B are arranged such that the rotors 134A-D are spaced between the main wing 131. In some examples, a vertical spacing between corresponding rotors (e.g., rotor 134A and rotor 134B or rotor 134C and rotor 134D) may be 0.9 meters.

The rotors 134A-D may be configured to drive one or more generators for the purpose of generating electrical energy. In this example, the rotors 134A-D may each include one or more blades, such as three blades. The one or more rotor blades may rotate via interactions with the wind and which could be used to drive the one or more generators. In addition, the rotors 134A-D may also be configured to provide a thrust to the aerial vehicle 130 during flight. With this arrangement, the rotors 134A-D may function as one or more propulsion units, such as a propeller. Although the rotors 134A-D are depicted as four rotors in this example, in other examples the aerial vehicle 130 may include any number of rotors, such as less than four rotors or more than four rotors.

The tail boom 135 may connect the main wing 131 to the tail wing 136. The tail boom 135 may have a variety of dimensions. For example, the tail boom 135 may have a length of 2 meters. Moreover, in some implementations, the tail boom 135 could take the form of a body and/or fuselage of the aerial vehicle 130. And in such implementations, the tail boom 135 may carry a payload.

The tail wing 136 and/or the vertical stabilizer 137 may be used to stabilize the aerial vehicle and/or reduce drag on the aerial vehicle 130 during hover flight, forward flight, and/or crosswind flight. For example, the tail wing 136 and/or the vertical stabilizer 137 may be used to maintain a pitch of the aerial vehicle 130 during hover flight, forward flight, and/or crosswind flight. In this example, the vertical stabilizer 137 is attached to the tail boom 135, and the tail wing 136 is located on top of the vertical stabilizer 137. The tail wing 136 may have a variety of dimensions. For example, the tail wing 136 may have a length of 2 meters. Moreover, in some examples, the tail wing 136 may have a surface area of 0.45 meters squared. Further, in some examples, the tail wing 136 may be located 1 meter above a center of mass of the aerial vehicle 130.

While the aerial vehicle 130 has been described above, it should be understood that the methods and systems described herein could involve any suitable aerial vehicle that is connected to a tether, such as the tether 120.

B. Illustrative Components of a AWT

Figure 2:
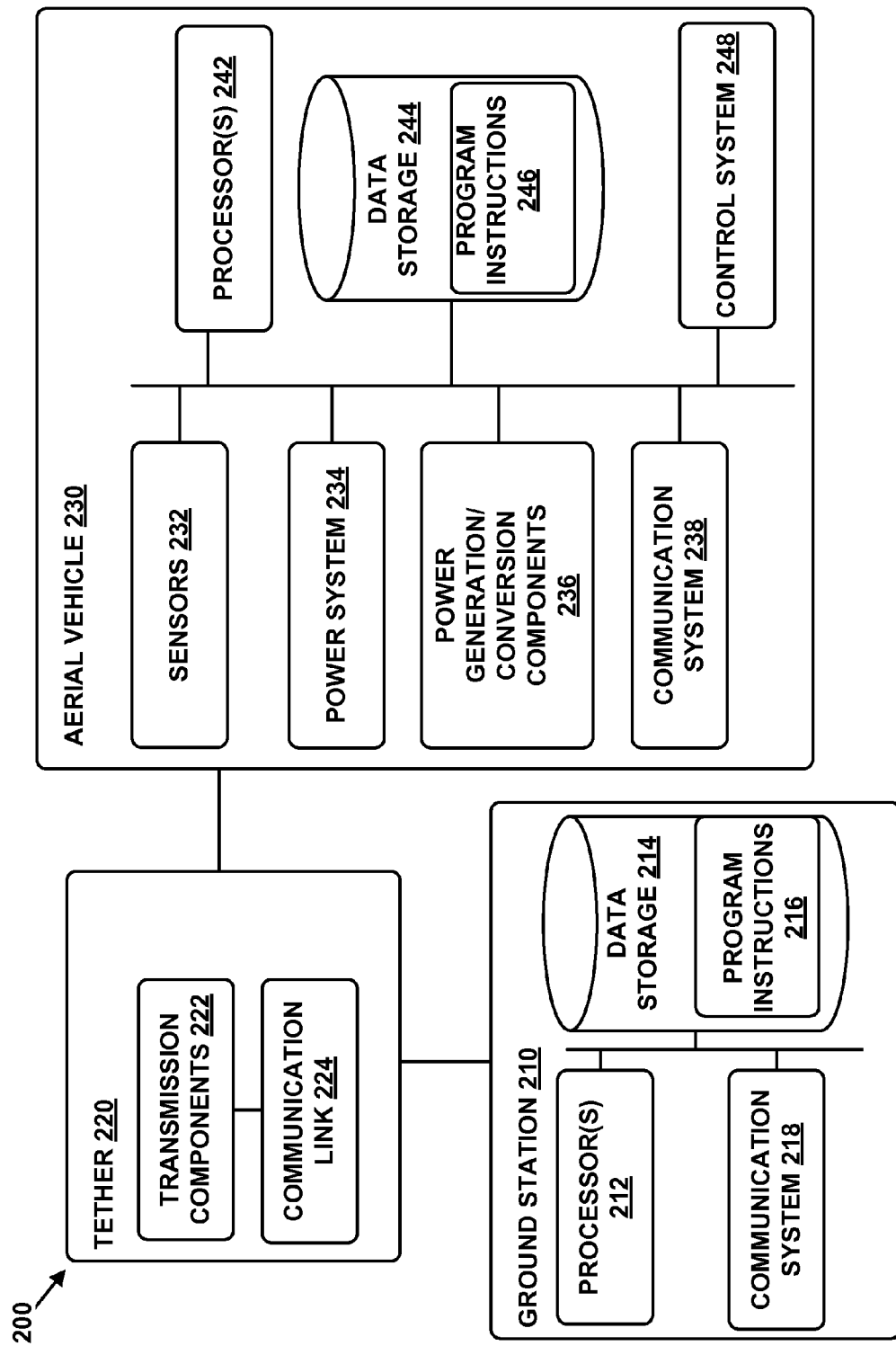
FIG. 2 is a simplified block diagram illustrating components of an AWT, according to an example embodiment.

FIG. 2 is a simplified block diagram illustrating components of the AWT 200. The AWT 200 may take the form of or be similar in form to the AWT 100. In particular, the AWT 200 includes a ground station 210, a tether 220, and an aerial vehicle 230. The ground station 210 may take the form of or be similar in form to the ground station 110, the tether 220 may take the form of or be similar in form to the tether 120, and the aerial vehicle 230 may take the form of or be similar in form to the aerial vehicle 130.

As shown in FIG. 2, the ground station 210 may include one or more processors 212, data storage 214, and program instructions 216. A processor 212 may be a general-purpose processor or a special purpose processor (e.g., digital signal processors, application specific integrated circuits, etc.). The one or more processors 212 can be configured to execute computer-readable program instructions 216 that are stored in a data storage 214 and are executable to provide at least part of the functionality described herein.

The data storage 214 may include or take the form of one or more computer-readable storage media that may be read or accessed by at least one processor 212. The one or more computer-readable storage media can include volatile and/or non-volatile storage components, such as optical, magnetic, organic or other memory or disc storage, which may be integrated in whole or in part with at least one of the one or more processors 212. In some embodiments, the data storage 214 may be implemented using a single physical device (e.g., one optical, magnetic, organic or other memory or disc storage unit), while in other embodiments, the data storage 214 can be implemented using two or more physical devices.

As noted, the data storage 214 may include computer-readable program instructions 216 and perhaps additional data, such as diagnostic data of the ground station 210. As such, the data storage 214 may include program instructions to perform or facilitate some or all of the functionality described herein.

In a further respect, the ground station 210 may include a communication system 218. The communications system 218 may include one or more wireless interfaces and/or one or more wireline interfaces, which allow the ground station 210 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network. The ground station 210 may communicate with the aerial vehicle 230, other ground stations, and/or other entities (e.g., a command center) via the communication system 218.

In an example embodiment, the ground station 210 may include communication systems 218 that allows for both short-range communication and long-range communication. For example, the ground station 210 may be configured for short-range communications using Bluetooth and for long-range communications under a CDMA protocol. In such an embodiment, the ground station 210 may be configured to function as a "hot spot"; or in other words, as a gateway or proxy between a remote support device (e.g., the tether 220, the aerial vehicle 230, and other ground stations) and one or more data networks, such as cellular network and/or the Internet. Configured as such, the ground station 210 may facilitate data communications that the remote support device would otherwise be unable to perform by itself.

For example, the ground station 210 may provide a WiFi connection to the remote device, and serve as a proxy or gateway to a cellular service provider's data network, which the ground station 210 might connect to under an LTE or a 3G protocol, for instance. The ground station 210 could also serve as a proxy or gateway to other ground stations or a command station, which the remote device might not be able to otherwise access.

Moreover, as shown in FIG. 2, the tether 220 may include transmission components 222 and a communication link 224. The transmission components 222 may be configured to transmit electrical energy from the aerial vehicle 230 to the ground station 210 and/or transmit electrical energy from the ground station 210 to the aerial vehicle 230. The transmission components 222 may take various different forms in various different embodiments. For example, the transmission components 222 may include one or more conductors that are configured to transmit electricity. And in at least one such example, the one or more conductors may include aluminum and/or any other material which allows for the conduction of electric current. Moreover, in some implementations, the transmission components 222 may surround a core of the tether 220 (not shown).

The ground station 210 could communicate with the aerial vehicle 230 via the communication link 224. The communication link 224 may be bidirectional and may include one or more wired and/or wireless interfaces. Also, there could be one or more routers, switches, and/or other devices or networks making up at least a part of the communication link 224.

Further, as shown in FIG. 2, the aerial vehicle 230 may include one or more sensors 232, a power system 234, power generation/conversion components 236, a communication system 238, one or more processors 242, data storage 244, and program instructions 246, and a control system 248.

The sensors 232 could include various different sensors in various different embodiments. For example, the sensors 232 may include a global positioning system (GPS) receiver. The GPS receiver may be configured to provide data that is typical of well-known GPS systems (which may be referred to as a global navigation satellite system (GNNS)), such as the GPS coordinates of the aerial vehicle 230. Such GPS data may be utilized by the AWT 200 to provide various functions described herein.

As another example, the sensors 232 may include one or more wind sensors, such as one or more pitot tubes. The one or more wind sensors may be configured to detect apparent and/or relative wind. Such wind data may be utilized by the AWT 200 to provide various functions described herein.

Still as another example, the sensors 232 may include an inertial measurement unit (IMU). The IMU may include both an accelerometer and a gyroscope, which may be used together to determine the orientation of the aerial vehicle 230. In particular, the accelerometer can measure the orientation of the aerial vehicle 230 with respect to earth, while the gyroscope measures the rate of rotation around an axis, such as a centerline of the aerial vehicle 230. IMUs are commercially available in low-cost, low-power packages. For instance, the IMU may take the form of or include a miniaturized MicroElectroMechanical System (MEMS) or a NanoElectroMechanical System (NEMS). Other types of IMUs may also be utilized. The IMU may include other sensors, in addition to accelerometers and gyroscopes, which may help to better determine position. Two examples of such sensors are magnetometers and pressure sensors. Other examples are also possible.

While an accelerometer and gyroscope may be effective at determining the orientation of the aerial vehicle 230, slight errors in measurement may compound over time and result in a more significant error. However, an example aerial vehicle 230 may be able mitigate or reduce such errors by using a magnetometer to measure direction. One example of a magnetometer is a low-power, digital 3-axis magnetometer, which may be used to realize an orientation independent electronic compass for accurate heading information. However, other types of magnetometers may be utilized as well.

The aerial vehicle 230 may also include a pressure sensor or barometer, which can be used to determine the altitude of the aerial vehicle 230. Alternatively, other sensors, such as sonic altimeters or radar altimeters, can be used to provide an indication of altitude, which may help to improve the accuracy of and/or prevent drift of the IMU.

As noted, the aerial vehicle 230 may include the power system 234. The power system 234 could take various different forms in various different embodiments. For example, the power system 234 may include one or more batteries for providing power to the aerial vehicle 230. In some implementations, the one or more batteries may be rechargeable and each battery may be recharged via a wired connection between the battery and a power supply and/or via a wireless charging system, such as an inductive charging system that applies an external time-varying magnetic field to an internal battery and/or charging system that uses energy collected from one or more solar panels.

As another example, the power system 234 may include one or more motors or engines for providing power to the aerial vehicle 230. In some implementations, the one or more motors or engines may be powered by a fuel, such as a hydrocarbon-based fuel. And in such implementations, the fuel could be stored on the aerial vehicle 230 and delivered to the one or more motors or engines via one or more fluid conduits, such as piping. In some implementations, the power system 234 may be implemented in whole or in part on the ground station 210.

As noted, the aerial vehicle 230 may include the power generation/conversion components 236. The power generation/conversion components 326 could take various different forms in various different embodiments. For example, the power generation/conversion components 236 may include one or more generators, such as high-speed, direct-drive generators. With this arrangement, the one or more generators may be driven by one or more rotors, such as the rotors 134A-D. And in at least one such example, the one or more generators may operate at full rated power wind speeds of 11.5 meters per second at a capacity factor which may exceed 60 percent, and the one or more generators may generate electrical power from 40 kilowatts to 600 megawatts.

Moreover, as noted, the aerial vehicle 230 may include a communication system 238. The communication system 238 may take the form of or be similar in form to the communication system 218. The aerial vehicle 230 may communicate with the ground station 210, other aerial vehicles, and/or other entities (e.g., a command center) via the communication system 238.

In some implementations, the aerial vehicle 230 may be configured to function as a "hot spot"; or in other words, as a gateway or proxy between a remote support device (e.g., the ground station 210, the tether 220, other aerial vehicles) and one or more data networks, such as cellular network and/or the Internet. Configured as such, the aerial vehicle 230 may facilitate data communications that the remote support device would otherwise be unable to perform by itself.

For example, the aerial vehicle 230 may provide a WiFi connection to the remote device, and serve as a proxy or gateway to a cellular service provider's data network, which the aerial vehicle 230 might connect to under an LTE or a 3G protocol, for instance. The aerial vehicle 230 could also serve as a proxy or gateway to other aerial vehicles or a command station, which the remote device might not be able to otherwise access.

As noted, the aerial vehicle 230 may include the one or more processors 242, the program instructions 244, and the data storage 246. The one or more processors 242 can be configured to execute computer-readable program instructions 246 that are stored in the data storage 244 and are executable to provide at least part of the functionality described herein. The one or more processors 242 may take the form of or be similar in form to the one or more processors 212, the data storage 244 may take the form of or be similar in form to the data storage 214, and the program instructions 246 may take the form of or be similar in form to the program instructions 216.

Moreover, as noted, the aerial vehicle 230 may include the control system 248. In some implementations, the control system 248 may be configured to perform one or more functions described herein. The control system 248 may be implemented with mechanical systems and/or with hardware, firmware, and/or software. As one example, the control system 248 may take the form of program instructions stored on a non-transitory computer readable medium and a processor that executes the instructions. The control system 248 may be implemented in whole or in part on the aerial vehicle 230 and/or at least one entity remotely located from the aerial vehicle 230, such as the ground station 210. Generally, the manner in which the control system 248 is implemented may vary, depending upon the particular application.

While the aerial vehicle 230 has been described above, it should be understood that the methods and systems described herein could involve any suitable aerial vehicle that is connected to a tether, such as the tether 230 and/or the tether 110.

C. Transitioning an Aerial Vehicle from Hover Flight to Crosswind Flight

Figure 3A:
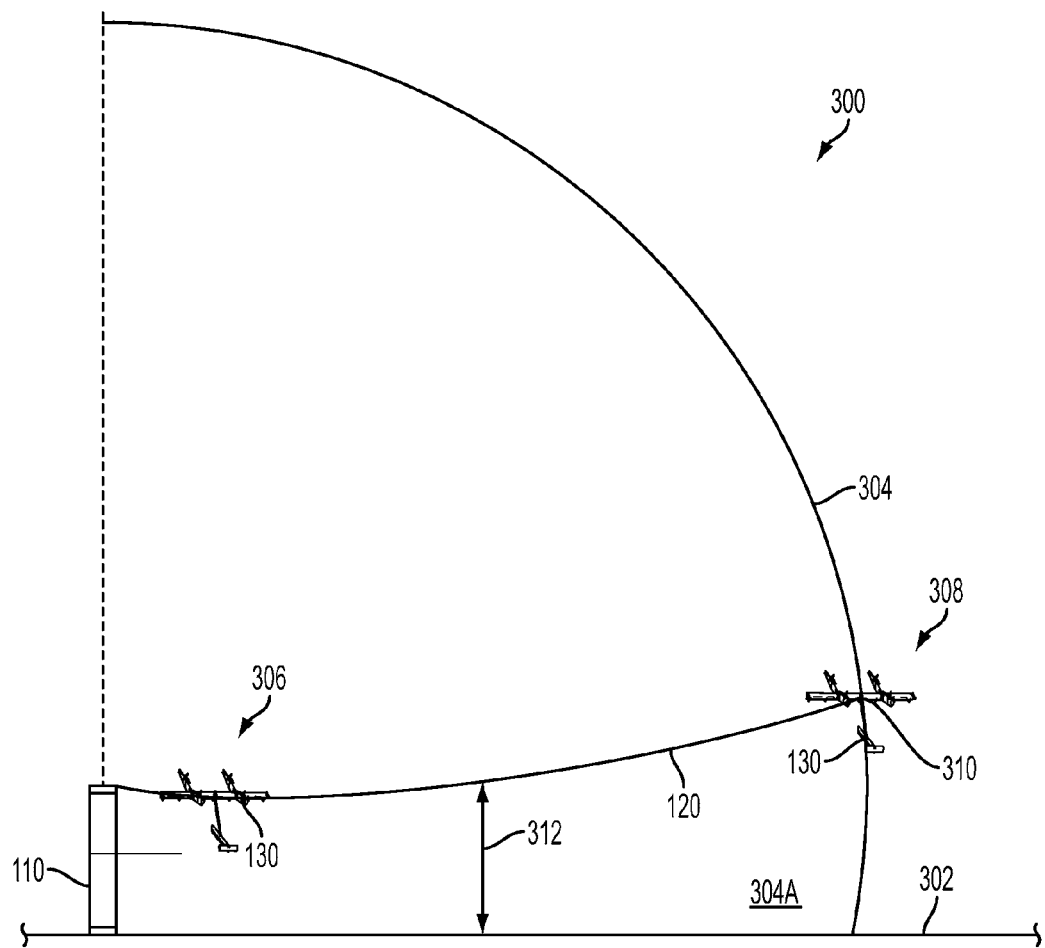
FIGS. 3a and 3b depict an example of an aerial vehicle transitioning from hover flight to crosswind flight, according to an example embodiment.
Figure 3B:
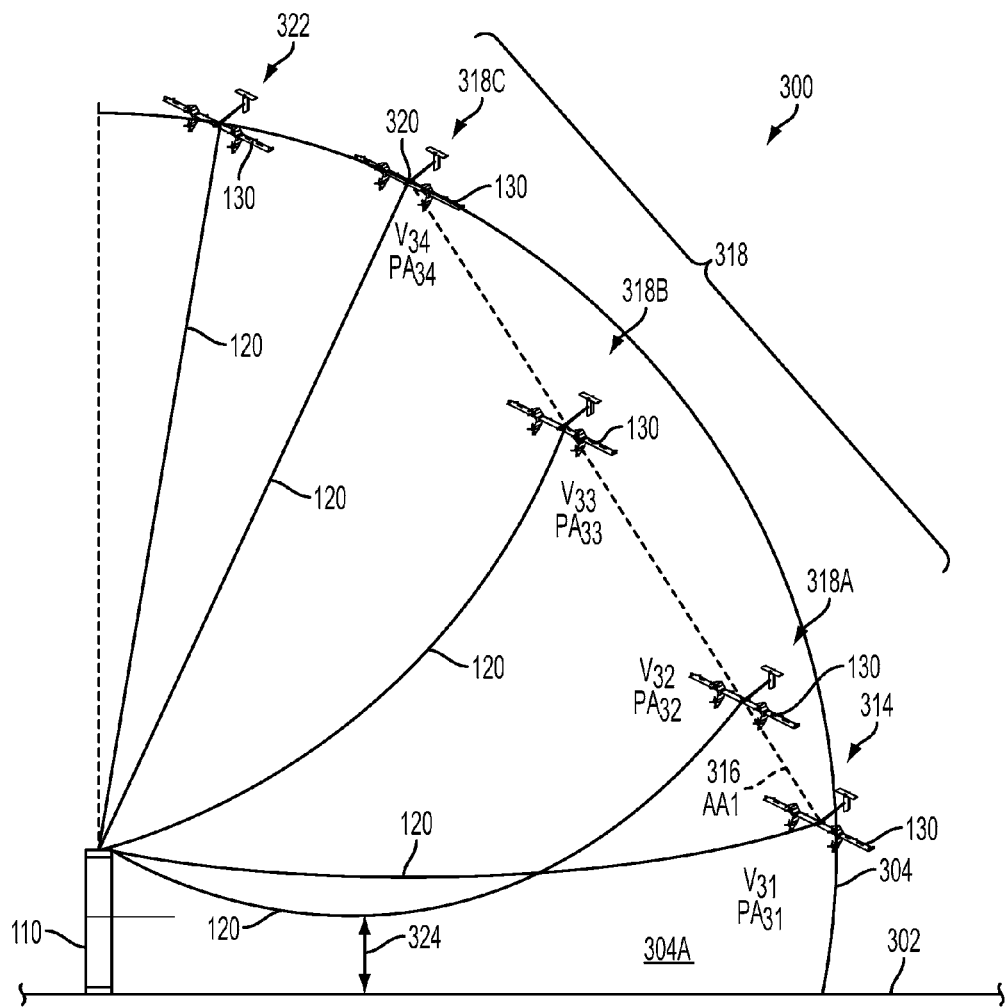

FIGS. 3a and 3b depict an example 300 of transitioning an aerial vehicle from hover flight to crosswind flight, according to an example embodiment. Example 300 is generally described by way of example as being carried out by the aerial vehicle 130 described above in connection with FIG. 1. For illustrative purposes, example 300 is described in a series of actions as shown in FIGS. 3a and 3b, though example 300 could be carried out in any number of actions and/or combination of actions.

As shown in FIG. 3a, the aerial vehicle 130 is connected to the tether 120, and the tether 120 is connected to the ground station 110. The ground station 110 is located on ground 302. Moreover, as shown in FIG. 3, the tether 120 defines a tether sphere 304 having a radius based on a length of the tether 120, such as a length of the tether 120 when it is extended. Example 300 may be carried out in and/or substantially on a portion 304A of the tether sphere 304. The term "substantially on," as used in this disclosure, refers to exactly on and/or one or more deviations from exactly on that do not significantly impact transitioning an aerial vehicle between certain flight modes as described herein.

Example 300 begins at a point 306 with deploying the aerial vehicle 130 from the ground station 110 in a hover-flight orientation. With this arrangement, the tether 120 may be paid out and/or reeled out. In some implementations, the aerial vehicle 130 may be deployed when wind speeds increase above a threshold speed (e.g., 3.5 m/s) at a threshold altitude (e.g., over 200 meters above the ground 302).

Further, at point 306 the aerial vehicle 130 may be operated in the hover-flight orientation. When the aerial vehicle 130 is in the hover-flight orientation, the aerial vehicle 130 may engage in hover flight. For instance, when the aerial vehicle engages in hover flight, the aerial vehicle 130 may ascend, descend, and/or hover over the ground 302. When the aerial vehicle 130 is in the hover-flight orientation, a span of the main wing 131 of the aerial vehicle 130 may be oriented substantially perpendicular to the ground 302. The term "substantially perpendicular," as used in this disclosure, refers to exactly perpendicular and/or one or more deviations from exactly perpendicular that do not significantly impact transitioning an aerial vehicle between certain flight modes as described herein.

Example 300 continues at a point 308 while the aerial vehicle 130 is in the hover-flight orientation positioning the aerial vehicle 130 at a first location 310 that is substantially on the tether sphere 304. As shown in FIG. 3a, the first location 310 may be in the air and substantially downwind of the ground station 110.

The term "substantially downwind," as used in this disclosure, refers to exactly downwind and/or one or more deviations from exactly downwind that do not significantly impact transitioning an aerial vehicle between certain flight modes as described herein.

For example, the first location 310 may be at a first angle from an axis extending from the ground station 110 that is substantially parallel to the ground 302. In some implementations, the first angle may be 30 degrees from the axis. In some situations, the first angle may be referred to as azimuth, and the first angle may be between 30 degrees clockwise from the axis and 330 degrees clockwise from the axis, such as 15 degrees clockwise from the axis or 345 degrees clockwise from the axis.

As another example, the first location 310 may be at a second angle from the axis. In some implementations, the second angle may be 10 degrees from the axis. In some situations, the second angle may be referred to as elevation, and the second angle may be between 10 degrees in a direction above the axis and 10 degrees in a direction below the axis. The term "substantially parallel," as used in this disclosure refers to exactly parallel and/or one or more deviations from exactly parallel that do not significantly impact transitioning an aerial vehicle between certain flight modes described herein.

At point 308, the aerial vehicle 130 may accelerate in the hover-flight orientation. For example, at point 308, the aerial vehicle 130 may accelerate up to a few meters per second. In addition, at point 308, the tether 120 may take various different forms in various different embodiments. For example, as shown in FIG. 3a, at point 308 the tether 120 may be extended. With this arrangement, the tether 120 may be in a catenary configuration. Moreover, at point 306 and point 308, a bottom of the tether 120 may be a predetermined altitude 312 above the ground 302. With this arrangement, at point 306 and point 308 the tether 120 may not contact the ground 302.

Example 300 continues at point 314 with transitioning the aerial vehicle 130 from the hover-flight orientation to a forward-flight orientation, such that the aerial vehicle 130 moves from the tether sphere 304. As shown in FIG. 3b, the aerial vehicle 130 may move from the tether sphere 304 to a location toward the ground station 110 (which may be referred to as being inside the tether sphere 304).

When the aerial vehicle 130 is in the forward-flight orientation, the aerial vehicle 130 may engage in forward flight (which may be referred to as airplane-like flight). For instance, when the aerial vehicle 130 engages in forward flight, the aerial vehicle 130 may ascend. The forward-flight orientation of the aerial vehicle 130 could take the form of an orientation of a fixed-wing aircraft (e.g., an airplane) in horizontal flight. In some examples, transitioning the aerial vehicle 130 from the hover-flight orientation to the forward-flight orientation may involve a flight maneuver, such as pitching forward. And in such an example, the flight maneuver may be executed within a time period, such as less than one second.

At point 314, the aerial vehicle 130 may achieve attached flow. Further, at point 314, a tension of the tether 120 may be reduced. With this arrangement, a curvature of the tether 120 at point 314 may be greater than a curvature of the tether 120 at point 308. As one example, at point 314, the tension of the tether 120 may be less than 1 KN, such as 500 newtons (N).

Example 300 continues at one or more points 318 with operating the aerial vehicle 130 in the forward-flight orientation to ascend at an angle of ascent AA1 to a second location 320 that is substantially on the tether sphere 304. As shown in FIG. 3b, the aerial vehicle 130 may fly substantially along a path 316 during the ascent at one or more points 318. In this example, one or more points 318 is shown as three points, a point 318A, a point 318B, and a point 318C. However, in other examples, one or more points 318 may include less than three or more than three points.

In some examples, the angle of ascent AA1 may be an angle between the path 316 and the ground 302. Further, the path 316 may take various different forms in various different embodiments. For instance, the path 316 may be a line segment, such as a chord of the tether sphere 304.

In some implementations, the aerial vehicle 130 may have attached flow during the ascent. Moreover, in such an implementation, effectiveness of one or more control surfaces of the aerial vehicle 130 may be maintained. Further, in such an implementation, example 300 may involve selecting a maximum angle of ascent, such that the aerial vehicle 130 has attached flow during the ascent. Moreover, in such an implementation, example 300 may involve adjusting a pitch angle of the aerial vehicle 130 based on the maximum angle of ascent and/or adjusting thrust of the aerial vehicle 130 based on the maximum angle of ascent. In some examples, the adjusting thrust of the aerial vehicle 130 may involve using differential thrusting of one or more of the rotors 134A-D of the aerial vehicle 130. The pitch angle may be an angle between the aerial vehicle 130 and a vertical axis that is substantially perpendicular to the ground 302.

As shown in FIG. 3b, at point 314 the aerial vehicle 130 may have a speed V31 and a pitch angle PA31; at point 318A the aerial vehicle 130 may have a speed V32 and a pitch angle PA32; at point 318B the aerial vehicle 130 may have a speed V33 and a pitch angle PA33; and at point 318C the aerial vehicle 130 may have a speed V34 and a pitch angle PA34.

In some implementations, the angle of ascent AA1 may be selected before point 318A. With this arrangement, the pitch angle PA31 and/or the pitch angle PA32 may be selected based on the angle of ascent AA1. Further, in some examples, the pitch angle PA32, the pitch angle PA33, and/or the pitch angle PA34 may be equal to the pitch angle PA31. However, in other examples, the pitch angles PA31, PA32, PA33, and/or PA34 may be different than each other. For instance, the pitch angle PA31 may be greater or less than pitch angles PA32, PA33, and/or PA34; the pitch angle PA32 may be greater or less than pitch angles PA33, PA34, and/or PA31; the pitch angle PA33 may be greater or less than pitch angles PA34, PA31, and/or PA32; and the pitch angle PA34 may be greater or less than pitch angles PA31, PA32, and/or PA33. Further, the pitch angle PA33 and/or PA34 may be selected and/or adjusted during the ascent. Further still, the pitch angle PA31 and/or PA32 may be adjusted during the ascent.

Moreover, in some implementations, the speed V31 and/or the speed V32 may be selected based on the angle of ascent AA1. Further, in some examples, the speed V32, the speed V33, and the speed V34 may be equal to the speed V31. However, in other examples, speeds V31, V32, V33, and V34 may be different than each other. For example, the speed V34 may be greater than the speed V33, the speed V33 may be greater than the speed V32, and the speed V32 may be greater than the speed V31. Further, speeds V31, V32, V33, and/or V34 may be selected and/or adjusted during the ascent.

In some implementations, any or all of the speeds V31, V32, V33, and/or V34 may be a speed that corresponds with a maximum (or full) throttle of the aerial vehicle 130. Further, in some implementations, at the speed V32, the aerial vehicle 130 may ascend in a forward-flight orientation. Moreover, at the speed V32, the angle of ascent AA1 may be converged.

As shown in FIG. 3b, the second location 320 may be in the air and substantially downwind of the ground station 110. The second location 320 may be oriented with respect to the ground station 110 in a similar way as the first location 310 may be oriented with respect to the ground station 110.

For example, the second location 320 may be at a first angle from an axis extending from the ground station 110 that is substantially parallel to the ground 302. In some implementations, the first angle may be 30 degrees from the axis. In some situations, the first angle may be referred to as azimuth, and the angle may be between 30 degrees clockwise from the axis and 330 degrees clockwise from the axis, such as 15 degrees clockwise from the axis or 345 degrees clockwise from the axis.

In addition, as shown in FIG. 3b, the second location 320 may be substantially upwind of the first location 310. The term "substantially upwind," as used in this disclosure, refers to exactly upwind and/or one or more deviations from exactly upwind that do not significantly impact transitioning an aerial vehicle between certain flight modes as described herein.

At one or more points 318, a tension of the tether 120 may increase during the ascent. For example, a tension of the tether 120 at point 318C may be greater than a tension of the tether 120 at point 318B, a tension of the tether 120 at point 318B may be greater than a tension of the tether 120 at point 318A. Further, a tension of the tether 120 at point 318A may be greater than a tension of the tether at point 314.

With this arrangement, a curvature of the tether 120 may decrease during the ascent. For example, a curvature the tether 120 at point 318C may be less than a curvature the tether at point 318B, and a curvature of the tether 120 at point 318B may be less than a curvature of the tether at point 318A. Further, in some examples, a curvature of the tether 120 at point 318A may be less than a curvature of the tether 120 at point 314.

Moreover, in some examples, when the aerial vehicle 130 includes a GPS receiver, operating the aerial vehicle 130 in the forward-flight orientation to ascend at an angle of ascent may involve monitoring the ascent of the aerial vehicle 130 with the GPS receiver. With such an arrangement, control of a trajectory of the aerial vehicle 130 during the ascent may be improved. As a result, the aerial vehicle 130's ability to follow one or more portions and/or points of the path 316 may be improved.

Further, in some examples, when the aerial vehicle 130 includes at least one pitot tube, operating the aerial vehicle 130 in a forward-flight orientation to ascend at an angle of ascent may involve monitoring an angle of attack of the aerial vehicle 130 or a side slip of the aerial vehicle 130 during the ascent with the at least one pitot tube. With such an arrangement, control of the trajectory of the aerial vehicle during the ascent may be improved. As a result, the aerial vehicle 130's ability to follow one or more portions and/or points of the path 316 may be improved. The angle of attack may be an angle between a body axis of the aerial vehicle 130 and an apparent wind vector. Further, the side slip may be an angle between a direction substantially perpendicular to a heading of the aerial vehicle 130 and the apparent wind vector.

Example 300 continues at a point 322 with transitioning the aerial vehicle 130 from the forward-flight orientation to a crosswind-flight orientation. In some examples, transitioning the aerial vehicle 130 from the forward-flight orientation to the crosswind-flight orientation may involve a flight maneuver.

When the aerial vehicle 130 is in the crosswind-flight orientation, the aerial vehicle 130 may engage in crosswind flight. For instance, when the aerial vehicle 130 engages in crosswind flight, the aerial vehicle 130 may fly substantially along a path, such as path 150, to generate electrical energy. In some implementations, a natural roll and/or yaw of the aerial vehicle 130 may occur during crosswind flight.

As shown in FIG. 3b, at points 314-322 a bottom of the tether 120 may be a predetermined altitude 324 above the ground 302. With this arrangement, at points 314-322 the tether 120 may not touch the ground 302. In some examples, the predetermined altitude 324 may be less than the predetermined altitude 312. In some implementations, the predetermined altitude 324 may be greater than one half of the height of the ground station 110. And in at least one such implementation, the predetermined altitude 324 may be 6 meters.

Thus, example 300 may be carried out so that the tether 120 may not contact the ground 302. With such an arrangement, the mechanical integrity of the tether 120 may be improved. For example, the tether 120 might not catch on (or tangle around) objects located on the ground 302. As another example, when the tether sphere 304 is located above a body of water (e.g., an ocean, a sea, a lake, a river, and the like), the tether 120 might not be submersed in the water. In addition, with such an arrangement, safety of one or more people located near the ground station 110 (e.g., within the portion 304A of the tether sphere 304) may be improved.

In addition, example 300 may be carried out so that a bottom of the tether 120 remains above the predetermined altitude 324. With such an arrangement, the mechanical integrity of the tether 120 may be improved as described herein and/or safety of one or more people located near the ground station 110 (e.g., within the portion 304A of the tether sphere 304) may be improved.

Moreover, one or more actions that correspond with points 306-322 may be performed at various different time periods in various different embodiments. For instance, the one or more actions that correspond with point 306 may be performed at a first time period, the one or more actions that correspond with point 308 may be performed at a second time period, the one or more actions that correspond with point 314 may be performed at a third time period, the one or more actions that correspond with point 318A may be performed at a fourth time period, the one or more actions that correspond with point 318B may be performed at a fifth time period, the one or more actions that correspond with point 318C may be performed at a sixth time period, and the one or more actions that correspond with point 322 may be performed at a seventh time period. However, in other examples, at least some of the actions of the one or more actions that correspond with points 306-322 may be performed concurrently.

Figure 4A:
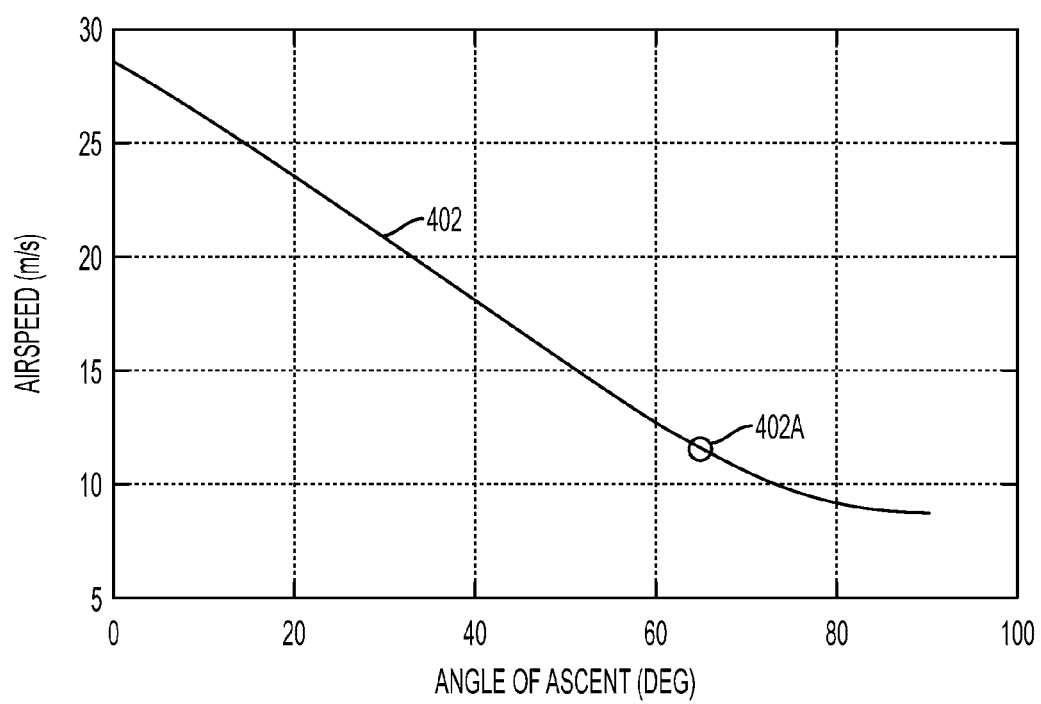
FIGS. 4a-c are graphical representations involving an angle of ascent, according to an example embodiment.
Figure 4B:
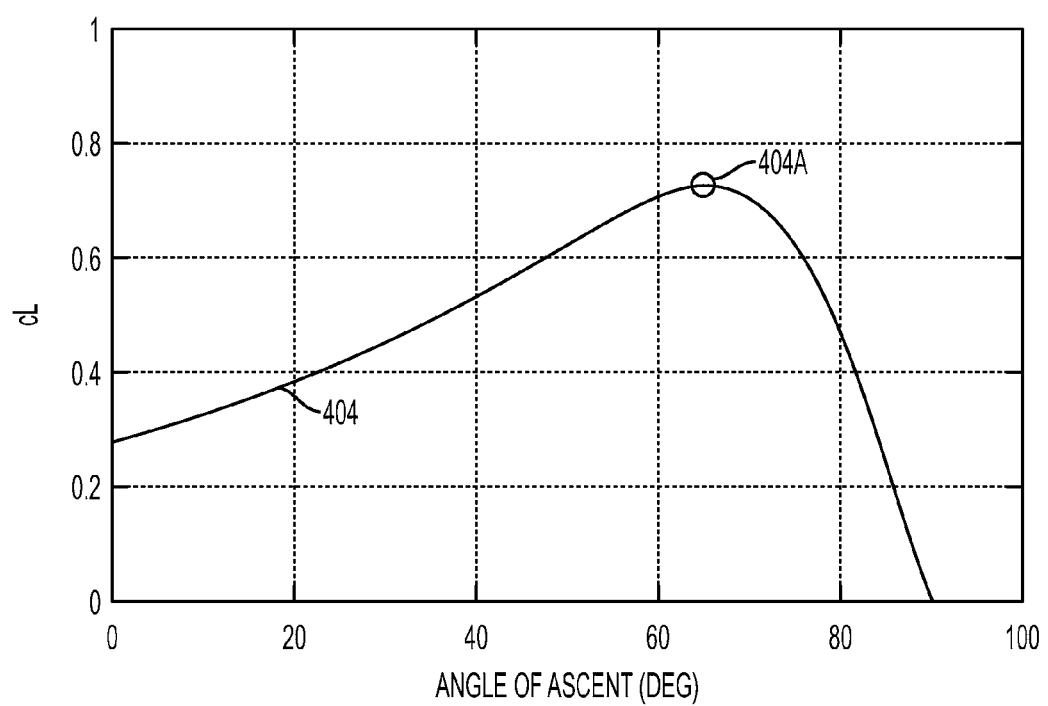
Figure 4C:
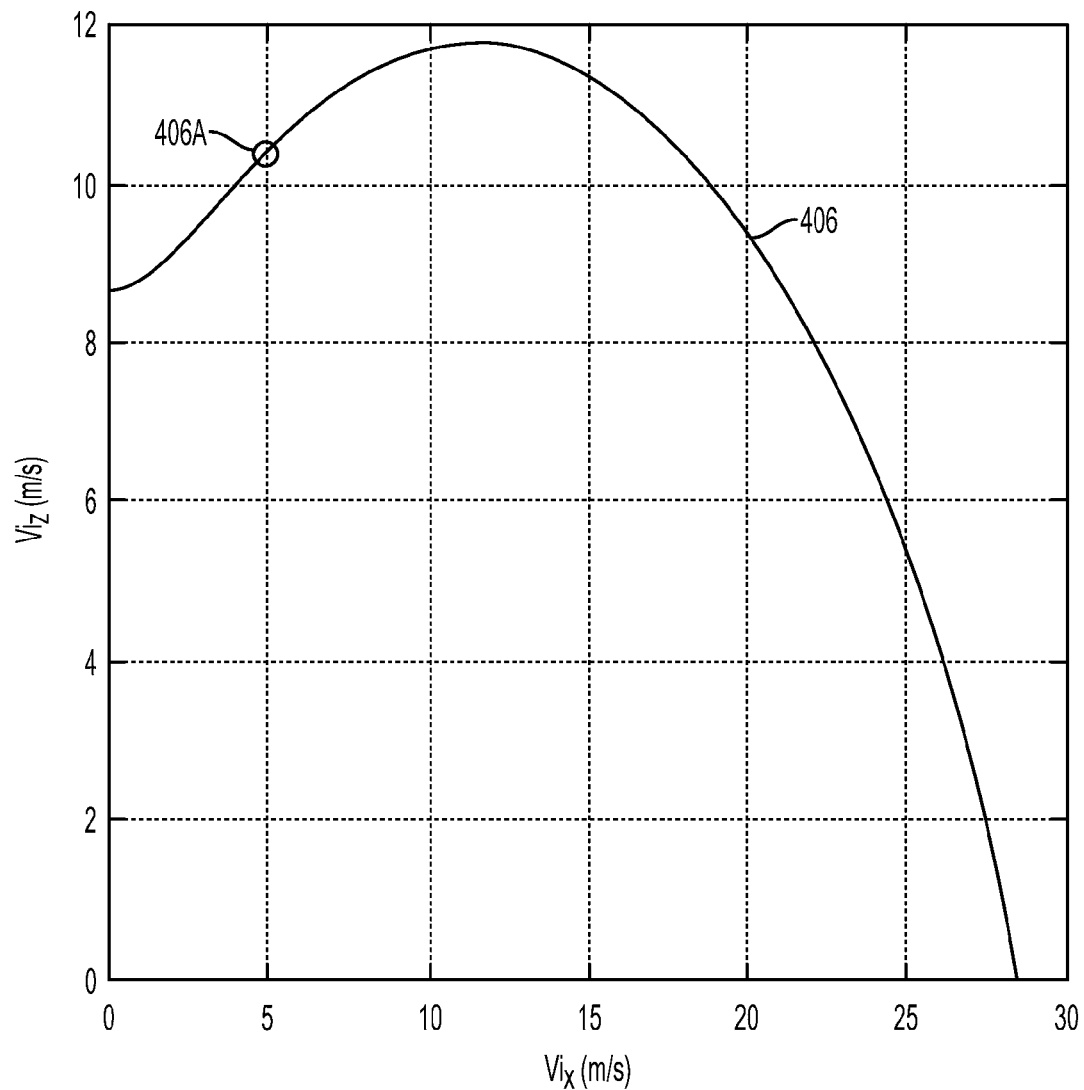

FIGS. 4a-c are graphical representations involving an angle of ascent, according to an example embodiment. In particular, FIG. 4a is a graphical representation 402, FIG. 4b is a graphical representation 404, and FIG. 4c is a graphical representation 406. Each of graphical representations 402, 404, and 406 may be based on example 300.

More specifically, in FIGS. 4a-c, an aerial vehicle in an example of transitioning the aerial vehicle from hover flight to crosswind flight may have a thrust-to-weight ratio (T/W) of 1.3 and a coefficient of drag ($C_D$) equal to the equation $3+(C_L^2/eAR\pi)$, where $C_L$ is coefficient of lift, e is span efficiency of the aerial vehicle, and AR is aspect ratio of the aerial vehicle. However, in other examples, aerial vehicles described herein may have various other thrust-to-weight ratios, such as a thrust-to-weight ratio greater than 1.2. Further, in other examples, aerial vehicles described herein may have various other values of $C_D$, such as a value of $C_D$ between 0.1 and 0.2.

As noted, FIG. 4a is the graphical representation 402. In particular, the graphical representation 402 depicts an angle of ascent of an aerial vehicle in relation to air speed. In graphical representation 402, the angle of ascent may be measured in degrees, and the airspeed may be measured in m/s. As shown in FIG. 4a, a point 402A on the graphical representation 402 may represent a maximum angle of ascent of an aerial vehicle for attached flow during an ascent, such as at one or more points 318 in example 300. In graphical representation 402, the maximum angle of ascent may be about 65 degrees, and an airspeed that corresponds with the maximum angle of ascent may be about 11 m/s.

Moreover, as noted, FIG. 4b is the graphical representation 404. In particular, the graphical representation 404 depicts an angle of ascent of an aerial vehicle in relation to $C_L$ of the aerial vehicle. In graphical representation 404, the angle of ascent may be measured in degrees, and $C_L$ may be a value without a unit of measurement. As shown in FIG. 4b, a point 404A on the graphical representation 404 may represent a maximum angle of ascent of an aerial vehicle for attached flow during an ascent, such as at one or more points 318 in example 300. In graphical representation 404, the maximum angle of ascent may be about 65 degrees, and the $C_L$ that corresponds with the maximum angle of ascent may be about 0.7.

Further, as noted, FIG. 4c is the graphical representation 406. In particular, the graphical representation 406 depicts a first component of a speed of an aerial vehicle in relation to a second component of the speed of the aerial vehicle. In graphical representation 406, the first and second components of speed of the aerial vehicle may be measured in m/s. In some examples, the first component of the speed of the aerial vehicle may be in a direction that is substantially parallel with the ground. Further, in some examples, the second component of the speed of the aerial vehicle may be in a direction that is substantially perpendicular with the ground.

As shown in FIG. 4c, a point 406A on the graphical representation 406 may represent a first and second component of a speed of the aerial vehicle when the aerial vehicle is at a maximum angle of ascent for attached flow during an ascent, such as at one or more points 318 in example 300. In graphical representation 406, the first component of the speed of the aerial vehicle that corresponds with the maximum angle of ascent may about 5 m/s, and the second component of the speed of the aerial vehicle that corresponds with the maximum angle of ascent may be about 10.25 m/s.

Figure 5B:
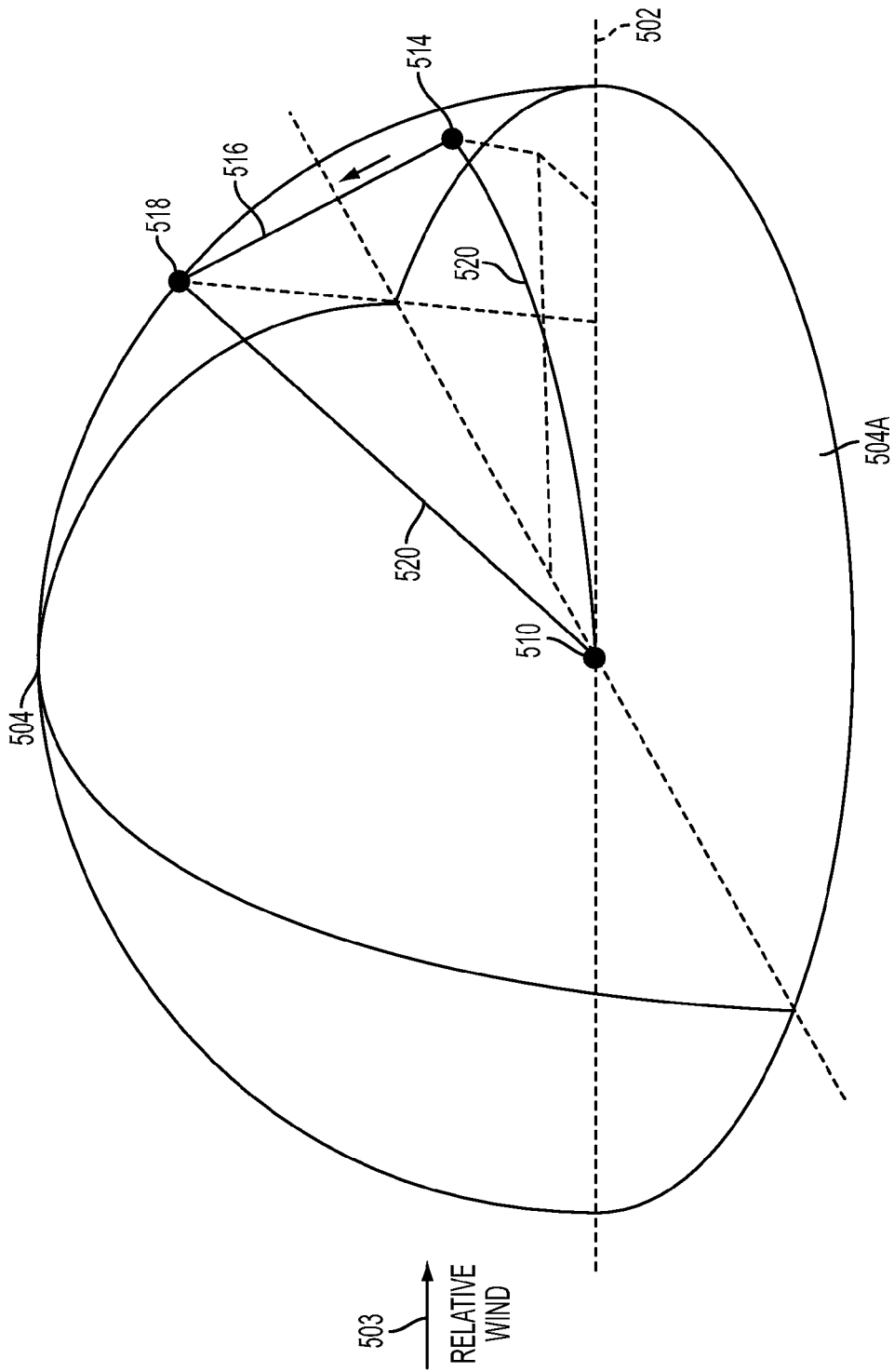

FIGS. 5a and 5b depict a tether sphere 504, according to an example embodiment. In particular, the tether sphere 504 has a radius based on a length of a tether 520, such as a length of the tether 520 when it is extended. As shown in FIGS. 5a and 5b, the tether 520 is connected to a ground station 510, and the ground station 510 is located on ground 502. Further, as shown in FIGS. 5a and 5b, relative wind 503 contacts the tether sphere 504. In FIGS. 5a and 5b, only a portion of the tether sphere 504 that is above the ground 502 is depicted. The portion may be described as one half of the tether sphere 504.

The ground 502 may take the form of or be similar in form to the ground 302, the tether sphere 504 may take the form of or be similar in form to the tether sphere 304, the ground station 510 may take the form of or be similar in form to the ground station 110 and/or the ground station 210, and the tether 520 may take the form of or be similar in form to the tether 120 and/or the tether 220.

Examples of transitioning an aerial vehicle between hover flight and crosswind flight described herein may be carried out in and/or substantially on a first portion 504A of the tether sphere 504. As shown in FIGS. 5a and 5b, the first portion 504A of the tether sphere 504 is substantially downwind of the ground station 510. The first portion 504A may be described as one quarter of the tether sphere 504.

The first portion 504A of the tether sphere 504 may take the form of or be similar in form to the portion 304A of the tether sphere 304.

Moreover, examples of transitioning an aerial vehicle between hover flight and crosswind flight described herein may be carried out at a variety of locations in and/or on the first portion 504A of the tether sphere 504. For instance, as shown in FIG. 5a, while the aerial vehicle is in a hover-flight orientation, the aerial vehicle may be positioned at a point 508 that is substantially on the first portion 504A of the tether sphere 504.

Further, as shown in FIG. 5b, when the aerial vehicle transitions from the hover-flight orientation to a forward-flight orientation, the aerial vehicle may be positioned at a point 514 that is inside the first portion 504A of the tether sphere 504. Further still, as shown in FIG. 5b, when the aerial vehicle ascends in the forward-flight orientation to a point 518 that is substantially on the first portion 504A of the tether sphere 504, the aerial vehicle may follow a path 516. The path 516 may take the form of a variety of shapes. For instance, the path 516 may be a line segment, such as a chord of the tether sphere 504. Other shapes and/or types of shapes are possible as well.

The point 508 may correspond to point 308 in example 300, the point 514 may correspond to point 314 in example 300, the point 518 may correspond to point 318C in example 300, and the path 516 may take the form of or be similar in form to the path 316.

Further, in accordance with this disclosure, the point 508 and the point 518 may be located at various locations that are substantially on the first portion 504A of the tether sphere 504, and the point 514 may be located at various locations that are inside the first portion 504A of the tether sphere 504.

D. Transitioning an Aerial Vehicle from Crosswind Flight to Hover Flight

Figure 6A:
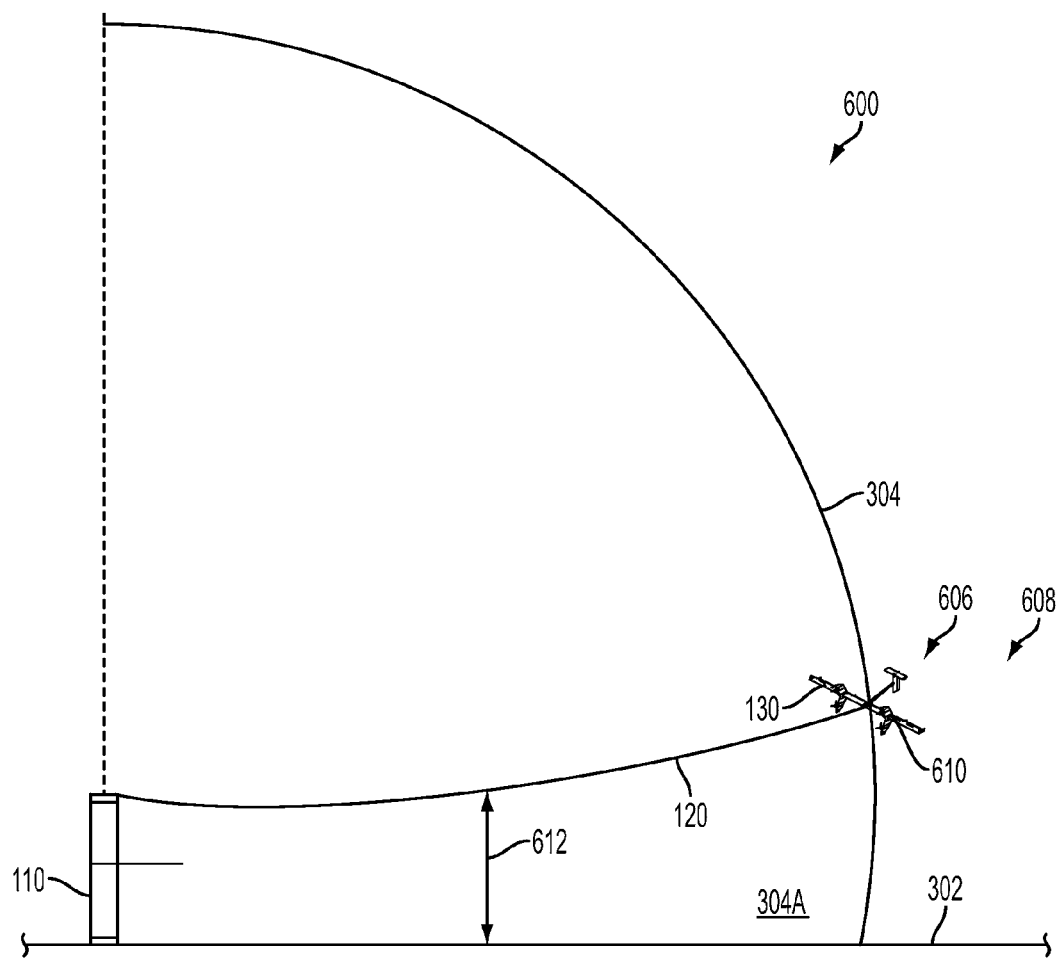
FIGS. 6a-c depict an example of an aerial vehicle transitioning from crosswind flight to hover flight, according to an example embodiment.
Figure 6B:
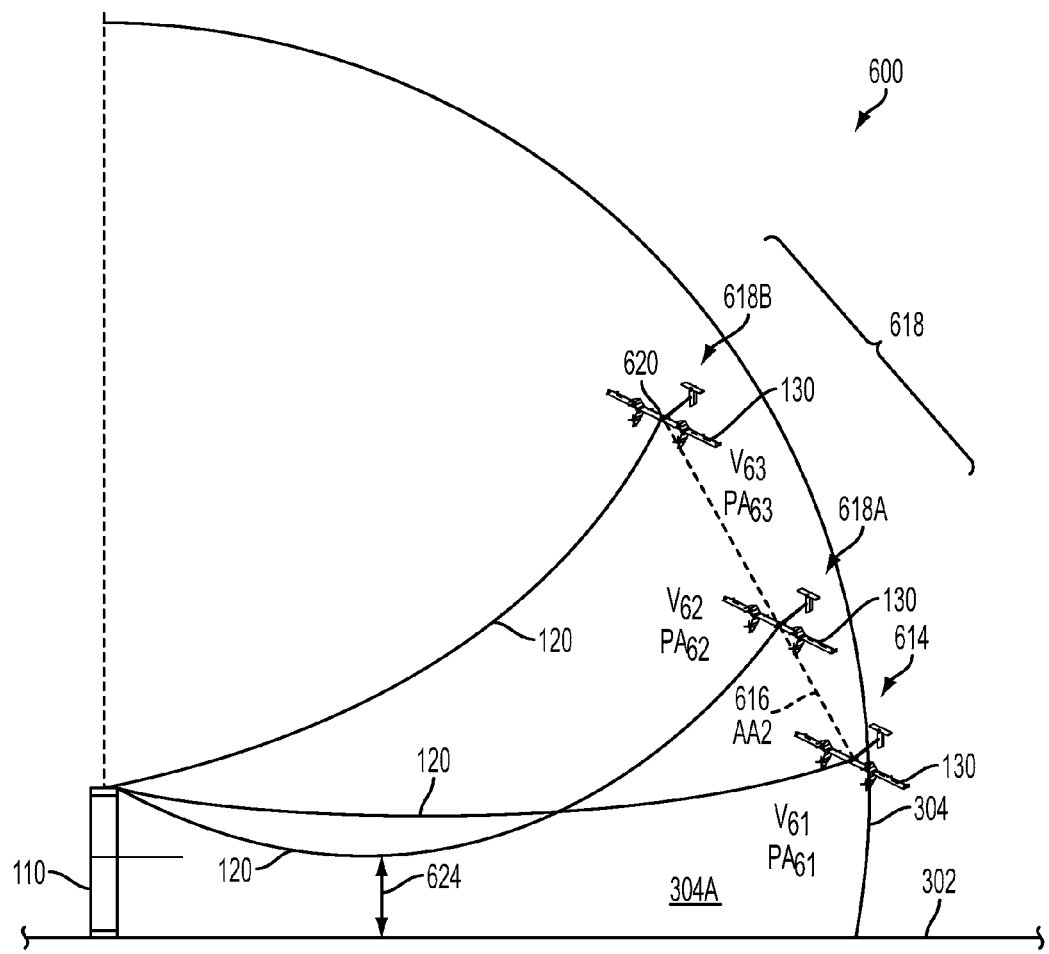
Figure 6C:
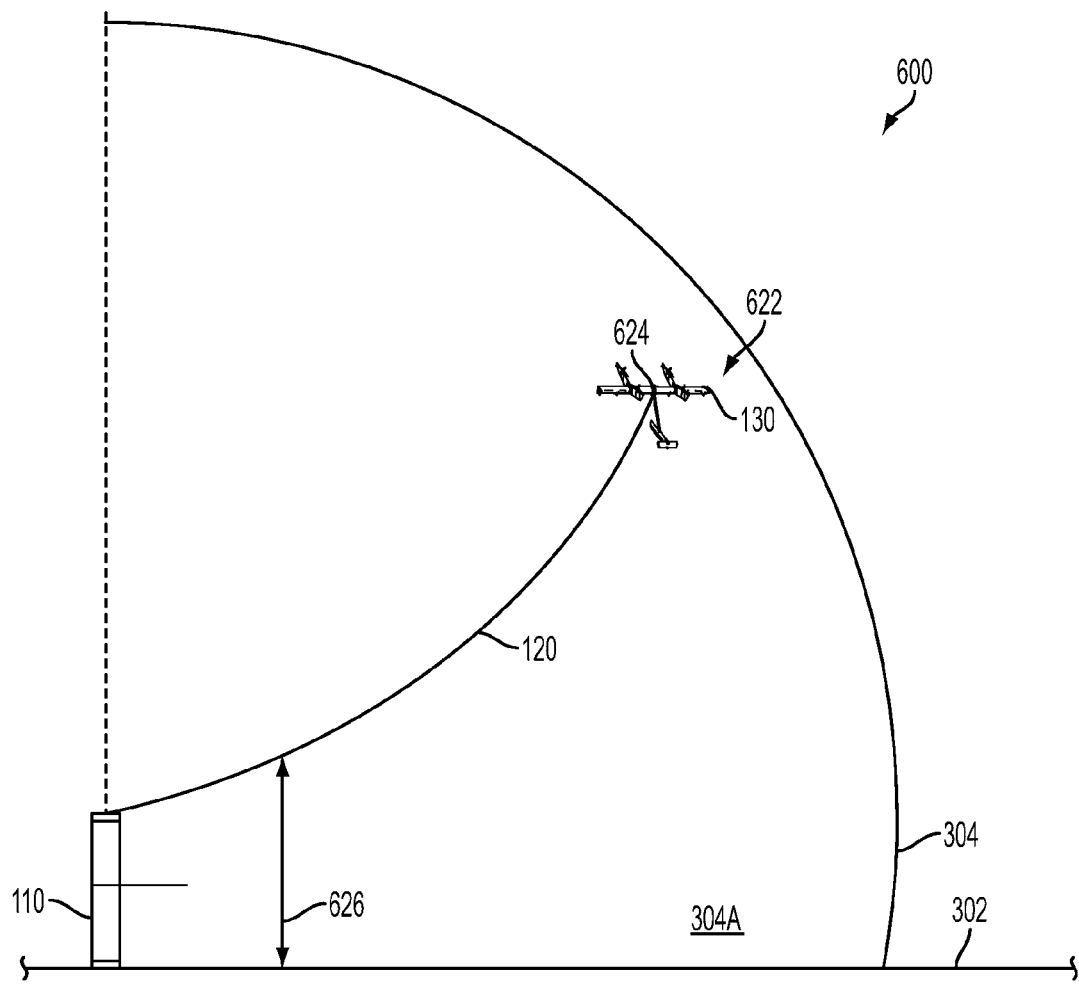

FIGS. 6a-c depict an example 600 of transitioning an aerial vehicle from crosswind flight to hover flight, according to an example embodiment. Example 600 is generally described by way of example as being carried out by the aerial vehicle 130 described above in connection with FIG. 1. For illustrative purposes, example 600 is described in a series of actions of the aerial vehicle 130 as shown in FIGS. 6a-c, though example 600 could be carried out in any number of actions and/or combination of actions.

As shown in FIG. 6a, the aerial vehicle 130 is connected to the tether 120, and the tether 120 is connected to the ground station 110. The ground station 110 is located on the ground 302. Moreover, as shown in FIG. 6a, the tether 120 defines the tether sphere 304. Example 600 may be carried out in and/or substantially on the portion 304A of the tether sphere 304.

Example 600 begins at a point 606 with operating the aerial vehicle 130 in a crosswind-flight orientation. When the aerial vehicle is in the crosswind-flight orientation, the aerial vehicle 130 may engage in crosswind flight. Moreover, at point 606 the tether 120 may be extended.

Example 600 continues at a point 608 with while the aerial vehicle 130 is in the crosswind-flight orientation, positioning the aerial vehicle 130 at a first location 610 that is substantially on the tether sphere 304. (In some examples, the first location 610 may be referred to as a third location). As shown in FIG. 6a, the first location 610 may in the air and substantially downwind of the ground station 110. The first location 610 may take the form of or be similar in form to the first location 310. However, in some examples, the first location 610 may have an altitude that is greater than an altitude of the first location 310.

For example, the first location 610 may be at a first angle from an axis that is substantially parallel to the ground 302. In some implementations, the angle may be 30 degrees from the axis. In some situations, the first angle may be referred to as azimuth, and the first angle may be between 30 degrees clockwise from the axis and 330 degrees clockwise from the axis, such as 15 degrees clockwise from the axis or 345 degrees clockwise from the axis.

Moreover, at point 606 and point 608, a bottom of the tether 120 may be a predetermined altitude 612 above the ground 302. With this arrangement, at point 606 and point 608 the tether 120 may not contact the ground 302. The predetermined altitude 612 may be greater than, less than, and/or equal to the predetermined altitude 312.

Example 600 continues at a point 614 with transitioning the aerial vehicle from the crosswind-flight orientation to a forward-flight orientation, such that the aerial vehicle 130 moves from the tether sphere 120. As shown in FIG. 6b, the aerial vehicle 130 may move from the tether sphere 304 to a location toward the ground station 110.

When the aerial vehicle 130 is in the forward-flight orientation, the aerial vehicle may engage in forward flight. In some examples, transitioning the aerial vehicle 130 from the crosswind-flight orientation to the forward-flight orientation may involve a flight maneuver, such as pitching forward. Further, in such an example, the flight maneuver may be executed within a time period, such as less than one second.

At point 614, the aerial vehicle 130 may achieve attached flow. Further, at point 314, a tension of the tether 120 may be reduced. With this arrangement, a curvature of the tether 120 at point 614 may be greater than a curvature of the tether 120 at point 608.

Example 600 continues at one or more points 618 with operating the aerial vehicle 130 in the forward-flight orientation to ascend at an angle of ascent AA2 to a second location 620. (In some examples, the second location 620 may be referred to as a fourth location). As shown in FIG. 6b, the aerial vehicle 130 may fly substantially along a path 616 during the ascent at one or more points 618. In this example, one or more points 618 includes two points, a point 618A and point 618B. However, in other examples, one or more points 618 may include less than two or more than two points.

In some examples, the angle of ascent AA2 may be an angle between the path 618 and the ground 302. Further, the path 616 may take various different forms in various different embodiments. For instance, the path 616 may a line segment, such as a chord of the tether sphere 304. Other shapes and/or types of shapes are possible as well. The angle of ascent AA2 may take the form of or be similar in form to the angle of ascent AA1, and the path 616 may take the form of or be similar in form to the path 316.

In some implementations, at one or more points 618, the aerial vehicle 130 may ascend with substantially no thrust provided by the rotors 134A-D of the aerial vehicle 130. With this arrangement, the aerial vehicle 130 may decelerate during the ascent. For instance, at one or more points 618, the rotors 134A-D of the aerial vehicle 130 may be shutoff. The term "substantially no," as used in this disclosure, refers to exactly no and/or one or more deviations from exactly no that do not significantly impact transitioning between certain flight modes as described herein.

Moreover, in some implementations, the aerial vehicle 130 may have attached flow during the ascent. And in such an implementation, effectiveness of one or more control surfaces of the aerial vehicle 130 may be maintained.

Further, in such an implementation, example 600 may involve selecting a maximum angle of ascent, such that the aerial vehicle 130 has attached flow during the ascent. Moreover, in such an implementation, example 600 may involve adjusting a pitch angle of the aerial vehicle based on the maximum angle of ascent and/or adjusting thrust of the aerial vehicle 130 based on the maximum angle of ascent. In some examples, the adjusting thrust of the aerial vehicle 130 may involve using differential thrusting of one or more of the rotors 134A-D of the aerial vehicle 130.

As shown in FIG. 6b, at point 614 the aerial vehicle 130 may have a speed V61 and a pitch angle PA61; at point 618A the aerial vehicle 130 may have a speed V62 and a pitch angle PA62; and at point 618B the aerial vehicle 130 may have a speed V63 and a pitch angle PA63.

In some implementations, the angle of ascent AA2 may be selected before point 618A. With this arrangement, the pitch angle PA61 and/or the pitch angle PA62 may be selected based on the angle of ascent AA2. Further, in some examples, the pitch angle PA62 and the pitch angle PA63 may be equal to the pitch angle PA61. However, in other examples, the pitch angles PA61, PA62, and PA63 may be different than each other. For instance, PA61 may be greater or less than PA62 and/or PA63; PA62 may be greater or less than PA63 and/or PA61; and PA63 may be greater or less than PA61 and/or PA62. Further, PA63 may be selected and/or adjusted during the ascent. Further still, PA61 and/or PA62 may be adjusted during the ascent.

Moreover, in some implementations, the speed V61 and/or the speed V62 may be selected based on the angle of ascent AA2. Further, in some examples, the speed V62, and the speed V63 may be equal to the speed V61. However, in other examples, the speeds V61, V62, V63 may be different than each other. For example, the speed V63 may be less than the speed V62, and the speed V62 may be less than the speed V61. Further, speeds V61, V62, and V63 may be selected and/or adjusted during the ascent.

In some implementations, any of speeds V61, V62, and/or V64 may be a speed that corresponds with a minimum (or no) throttle of the aerial vehicle 130. Further, in some implementations, at the speed V62, the aerial vehicle 130 may ascend in a forward-flight orientation. Moreover, at the speed V62, the angle of ascent AA2 may be converged. As shown in FIG. 6, the second location 620 may be in the air and substantially downwind of the ground station 110. The second location 620 may be oriented with respect to the ground station 110 a similar way as the first location 610 may be oriented with respect to the ground station 110.

For example, the first location 610 may be at a first angle from an axis that is substantially parallel to the ground 302. In some implementations, the angle may be 30 degrees from the axis. In some situations, the first angle may be referred to as azimuth, and the first angle may be between 30 degrees clockwise from the axis and 330 degrees clockwise from the axis, such as 15 degrees clockwise from the axis or 345 degrees clockwise from the axis.

As another example, the first location 610 may be at a second angle from the axis. In some implementations, the second angle may be 10 degrees from the axis. In some situations, the second angle may be referred to as elevation, and the second angle may be between 10 degrees in a direction above the axis and 10 degrees in a direction below the axis.

At one or more points 618, a tension of the tether 120 may increase during the ascent. For example, a tension of the tether 120 at point 618B may be greater than a tension of the tether at point 618A, and a tension of the tether at point 618A may be greater than a tension of the tether at point 614.

With this arrangement, a curvature of the tether 120 may decrease during the ascent. For example, a curvature the tether 120 at point 618B may be less than a curvature of the tether 120 at point 618A. Further, in some examples, a curvature of the tether 120 at point 618A may be less than a curvature of the tether 120 at point 614.

Moreover, in some examples, when the aerial vehicle 130 includes a GPS receiver, operating the aerial vehicle 130 in the forward-flight orientation to ascend at an angle of ascent may involve monitoring the ascent of the aerial vehicle with the GPS receiver. With such an arrangement, control of a trajectory of the aerial vehicle 130 during the ascent may be improved. As a result, the aerial vehicle 130's ability to follow one or more portions and/or portions of the path 616 may be improved.

Further, in some examples, when the aerial vehicle 130 includes at least one pitot tube, operating the aerial vehicle 130 in the forward-flight orientation to ascend at an angle of ascent may involve monitoring an angle of attack of the aerial vehicle 130 or a side slip of the aerial vehicle 130 during the ascent with the at least one pitot tube. With such an arrangement, control of the trajectory of the aerial vehicle 130 during the ascent may be improved. As a result, the aerial vehicle's ability to follow one or more portions and/or points of the path 616 may be improved.

Moreover, as shown in FIG. 6b, at point 614 and point 618 a bottom of the tether 120 may be a predetermined altitude 624 above the ground 302. With this arrangement, at point 614 and point 618 the tether 120 may not touch the ground 302. In some examples, the predetermined altitude 624 may be less than the predetermined altitude 612. And the predetermined altitude 624 may be greater than, less than, and/or equal to the predetermined the predetermined altitude 324. In some implementations, the predetermined altitude 624 may be greater than one half of the height of the ground station 110. And in at least one such implementation, the predetermined altitude 624 may be 6 meters.

Example 600 continues at a point 622 with transitioning the aerial vehicle 130 from the forward-flight orientation to a hover-flight orientation. In some examples, transitioning the aerial vehicle 130 from the forward-flight orientation to the hover-flight orientation may involve a flight maneuver. Further, transitioning the aerial vehicle 130 from the forward-flight orientation to the hover-flight orientation may occur when the aerial vehicle 130 has a threshold speed, such as 15 m/s. In some implementations, transitioning the aerial vehicle 130 from the forward-flight orientation to the hover-flight orientation may occur when the speed V63 is 15 m/s. Further, at point 622, a tension of the tether 120 may be greater than a tension of the tether at point 618B.

During the transition from the forward-flight orientation to the hover-flight orientation, the aerial vehicle 130 may be positioned at third location 624 (In some examples, the third location 624 may be referred to as a fifth location). As shown in FIG. 6c, the third location 624 may be in the air and substantially downwind of the ground station 110. In some implementations, the third location 624 could be the same as or similar to the second location 620. When the third location 624 is not substantially on the tether sphere 304, after point 622 the aerial vehicle 130 may be blown by the wind to a fourth location (not shown) that is substantially on the tether sphere 304.

Moreover, as shown in FIG. 6c, at point 622 a bottom of the tether 120 may be a predetermined altitude 626 above the ground 302. With this arrangement, at point 626 the tether 120 may not touch the ground 302. In some examples, the predetermined altitude 626 may be greater than the predetermined altitude 612 and/or the predetermined altitude 624.

Thus, example 600 may be carried out so that the tether 120 may not contact the ground 602. With such an arrangement, the mechanical integrity of the tether 120 may be improved. For example, the tether 120 might not catch on (or tangle around) objects located on the ground 302. As another example, when the tether sphere 304 is located above a body of water described herein, the tether 120 might not be submersed in the water. In addition, with such an arrangement, safety of one or more people located near the ground station 110 (e.g., within the portion 304A of the tether sphere 304) may be improved.

In addition, example 600 may be carried out so that a bottom of the tether 120 remains above the predetermined altitude 624. With such an arrangement, the mechanical integrity of the tether 120 may be improved as described herein and/or safety of one or more people located near the ground station may be improved.

Moreover, one or more actions that correspond with points 606-622 may be performed at various different time periods in various different embodiments. For instance, the one or more actions that correspond with point 606 may be performed at a first time period, the one or more actions that correspond with point 608 may be performed at a second time period, the one or more actions that correspond with point 614 may be performed at a third time period, the one or more actions that correspond with point 618A may be performed at a fourth time period, the one or more actions that correspond with point 618B may be performed at a fifth time period, and the one or more actions that correspond with point 622 may be performed at a seventh time period. However, in other examples, at least some of the actions of the one or more actions that correspond with points 606-622 may be performed concurrently.

Although example 600 has been described above with reference to FIGS. 6a-c, in accordance with this disclosure, point 608 and point 622 may occur at various locations that are substantially on the portion 304A of the tether sphere 304, and point 614 and one or more points 618 may occur at various locations that are inside the portion 304A of the tether sphere.

III. ILLUSTRATIVE DUAL-PITCH SUPPORT

Figure 7A:
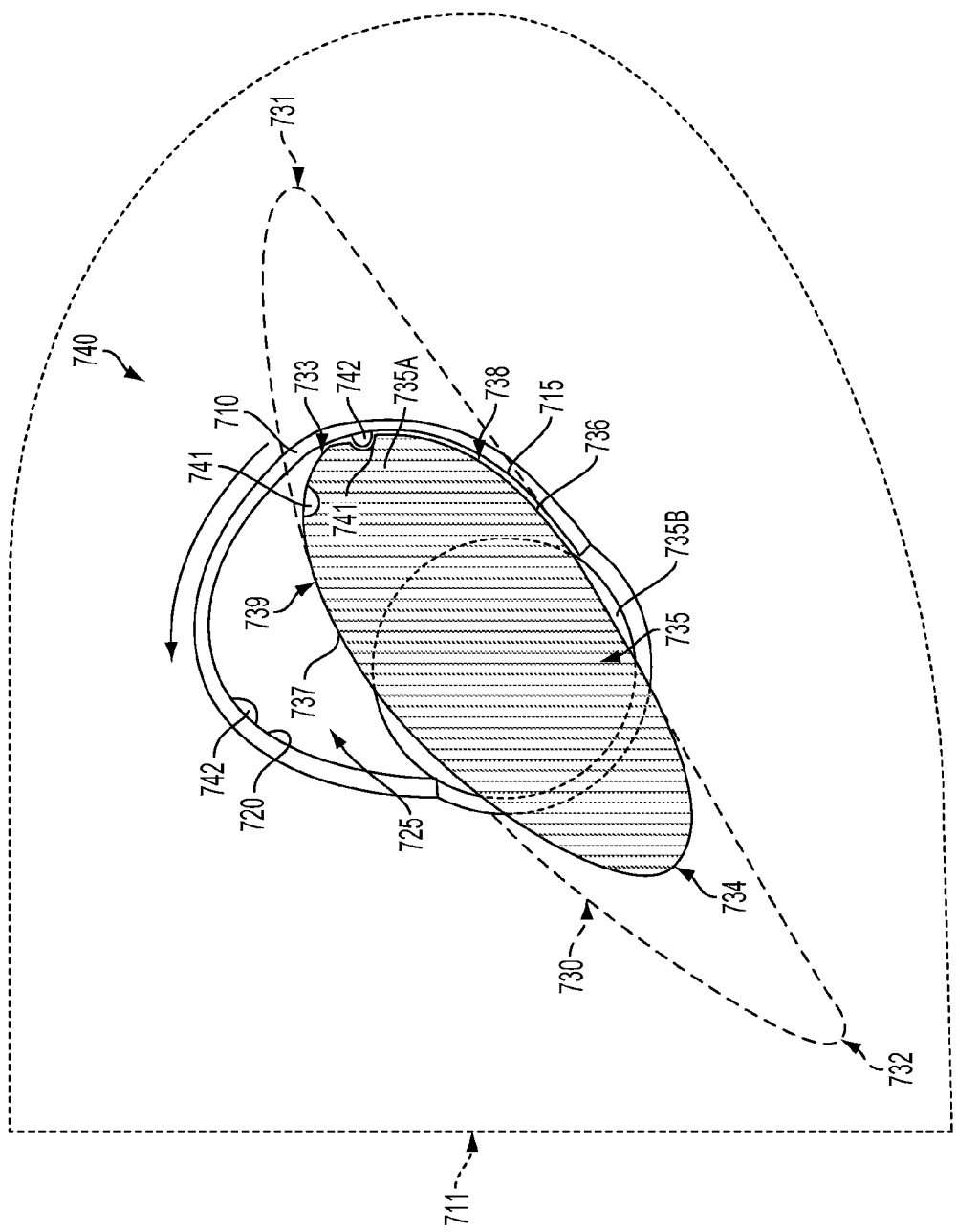
FIG. 7A is a cross-sectional end view of a dual-pitch support and propeller blade, according to an example embodiment, with the propeller blade positioned at a first pitch angle.

The present embodiments advantageously provide a dual-pitch support that may permit manual or passive transition of propeller blades from a low pitch angle to a high pitch angle in response to at least a force resulting from an aerial vehicle changing flight modes. This arrangement may beneficially increase the efficiency of an aerial vehicle on which the dual-pitch support is utilized. Referring now to FIGS. 7A and 7B, a dual-pitch support 710 is shown coupled to a rotor hub 711. The dual-pitch support 710 may have a first surface 715, a second surface 720 and a cavity 725 defined between the first surface 715 and the second surface 720. The dual-pitch support 710 may be made of a number of durable materials including metal, metal alloys, or composite materials, among other possibilities.

A propeller blade 730 may be rotatably coupled to the rotor hub 711. In one embodiment, the propeller blade 730 may be coupled to the rotor hub 711 via a bearing or a ball and socket joint, among other possibilities. The propeller blade 730 may include a blade root 735 at one end and a blade tip at the other end (not shown). The blade root 735 may include an eccentric portion 735A and a cylindrical shaft portion 735B. The cylindrical shaft portion 735B may serve as a coupling point to the rotor hub 711 via the bearing or ball and socket joint. The eccentric portion 735A may have a different profile than the propeller blade 730 (as shown) or the eccentric portion 735A may have the same profile as the propeller blade 730. For illustration purposes only, the blade root 735, 835 in FIGS. 7A, 7B, 8A, and 8B is shown located generally near the center of the propeller blade between the leading edge 731, 831 and the trailing edge 732, 832 of the propeller blade; however, the blade root may be located in other locations nearer or further from either the leading or trailing edge of the propeller blade, or the blade root may be located in front of or behind the leading or trailing edge of the propeller blade.

The blade root 735 may be disposed within the cavity 725 of the dual-pitch support 710. In a first position 740, as shown in FIG. 7A, a front face 736 of the blade root 735 may be positioned against the first surface 715 of the dual-pitch support 710. In a second position 745, as shown in FIG. 7B, a back face 737 of the blade root 735 may be positioned against the second surface 720 of the dual-pitch support 710. The dual-pitch support 710 may be shaped to accommodate the path of the leading edge 733 of the eccentric portion 735A of the propeller blade root as it rotates between the first surface 715 and the second surface 720. As shown in FIGS. 7A-B, the dual-pitch support 710 may further define an opening through which at least a portion of the trailing edge 734 of the propeller blade root 735 extends. In an alternative embodiment, rather than defining an opening, the dual-pitch support 710 may define a second cavity (not shown) shaped to accommodate the path of the trailing edge 734 of the propeller blade root 735 as it rotates from the first position 740 to the second position 745.

Further, pitch may be defined as the angle made between the chord of the propeller blade 730 and the plane of rotation of the propeller blade 730, where the chord is a straight line from the leading edge 733 of the propeller blade 730 to the trailing edge 734 of the propeller blade 730. In some embodiments, the propeller blade 730 may have a constant pitch along the length of the propeller blade 730. In other embodiments, the propeller blade's design features may cause different pitch at different points along the length of the propeller blade 730. For example, the physical profile of the propeller blade 730 may vary along the length of the propeller blade 730 and/or the propeller blade 730 may be twisted, varying the angle of the chord relative to the plane of rotation. In embodiments in which the pitch is not constant along the blade length, industry standards indicate the location along the propeller blade 730 at which to measure the propeller blade's pitch. For example, pitch may be measured at the widest part of the propeller blade 730 or at 75% of the radius of the propeller extending from the hub, among other possibilities.

In one embodiment, the propeller blade 730 may be oriented at a first pitch angle in the first position 740 and a second pitch angle in the second position 745. In a preferred embodiment, the first pitch angle may be lower than the second pitch angle. In various embodiments, the pitch angle at the tip of the propeller blade 730 may range from about 15 degrees to about 165 degrees between the first position 740 and the second position 745, where "about" means ±5%. In preferred embodiments, the propeller blade 730 may be configured such that the pitch angle at the tip of the propeller blade 730 may range from about 15 degrees to about 30 degrees between the first position 740 and the second position 745. In another preferred embodiment, the propeller blade 730 may be configured such that the pitch angle at the tip of the propeller blade 730 is about 20 degrees in the first position 740 and about 25 degrees in the second position 745.

Changing the pitch of the blade several degrees between the first position 740 and the second position 745 may have a significant impact on the required revolutions per minute ("RPM") for generating a given power. For example, the RPM required to generate a given power may be reduced by as much as 10% from a pitch change of 5 degrees. And a reduction in RPM may in turn significantly reduce sound levels of the propeller system. Larger changes in pitch between the first position 740 and the second position 745, for example, 90 to 150 degrees, may be utilized with very large nacelles.

In a further embodiment of the invention, the propeller blade 730 may be built with a laminate structure designed so as to twist under either axial or centripetal loading, or may include a segment with low torsional stiffness to assist flexing, or may include leading-edge balancing-mass to avoid aeroelastic flutter as a function of blade flexibility. In this embodiment, the profile of the propeller blade 730 near the blade root 735 would preferably be thin. The aeroelastic-deflecting propeller blade 730 may be used alone or in combination with the dual-pitch support.

In a further embodiment, the rotor hub 711 may be coupled to a plurality of dual-pitch supports 710, and the blade roots 735 of a plurality of propeller blades may be received in the cavity 725 of a corresponding dual-pitch support 710.

In a further embodiment, the blade root 735 may include at least one detent 741, and this detent(s) may be configured to receive a one or more protrusions 742 coupled to and/or integrated in the dual-pitch support 710. Reciprocally, in another embodiment, the dual-pitch support 710 may include one or more detents (not shown), and this detent may be configured to receive a protrusion (not shown) coupled to and/or integrated with the blade root 735. In various embodiments, a first detent may be arranged to help maintain the propeller 730 in the first position 740 and a second detent may be arranged to help maintain the propeller blade 730 in the second position 745.

In a further embodiment, the front face 736 of the blade root 735 may include a convex surface 738 and the first surface 715 of the dual-pitch support 710 may be reciprocally contoured to mate with the convex surface 738 of the front face 736. In addition, the back face 737 of the blade root 735 may include a convex surface 739 and the second surface 720 of the dual-pitch support 710 may be reciprocally contoured to mate with the convex surface 739 of the back face 737.

The embodiments as discussed above with respect to FIGS. 7A and 7B are applicable to the embodiments discussed below with respect to FIGS. 8A and 8B.

Figure 8A:
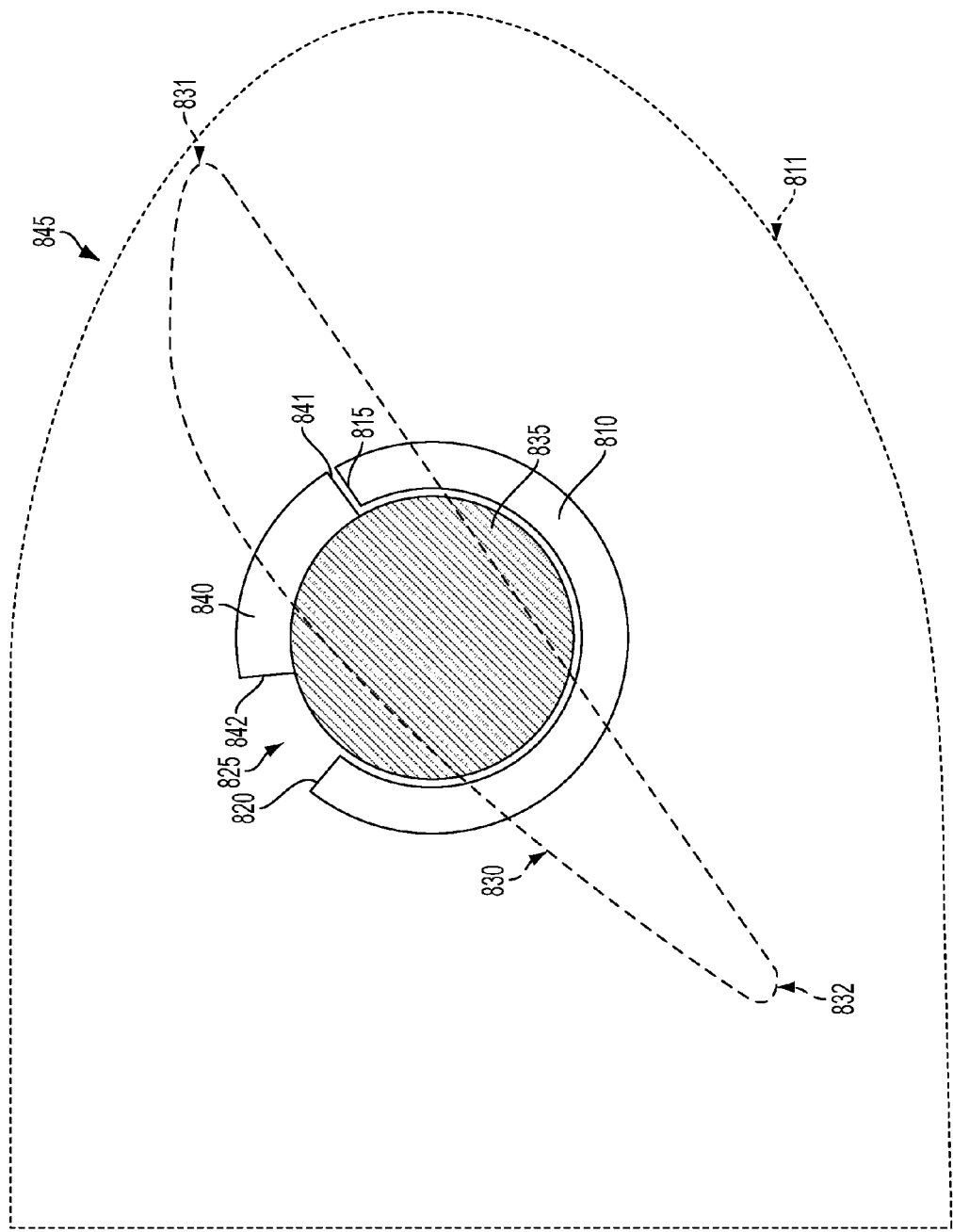
FIG. 8A is a cross-sectional end view of a dual-pitch support and propeller blade, according to another example embodiment, with the propeller blade positioned at a first pitch angle.

Referring now to FIGS. 8A and 8B, a dual-pitch support 810 is shown coupled to a rotor hub 811. The dual-pitch support 810 may have a first surface 815, a second surface 820 and a cavity 825 defined between the first surface 815 and the second surface 820. The cavity 825 may take the form of, for example, an opening or a slot.

A propeller blade 830 may be rotatably coupled to the rotor hub 811. In one embodiment, the propeller blade 830 may be coupled to the rotor hub 811 via a bearing or a ball and socket joint, among other possibilities. The propeller blade 830 may include a blade root 835, a portion of which may be arranged as a cylindrical shaft. The cylindrical shaft portion of blade root 835 may serve as a coupling point to the rotor hub 811 via the bearing or ball and socket joint.

The propeller blade 830 may include at least one protuberance 840 extending radially from the blade root 835. The protuberance 840 may be arranged within the cavity 825 defined between the first surface 815 and the second surface 820 of the dual-pitch support 810. In one embodiment, there may be one protuberance 840, such that the protuberance 840 may define a first shoulder 841 and a second shoulder 842. In a first position 845, as shown in FIG. 8A, the first shoulder 841 of the protuberance 840 may be positioned against the first surface 815 of the dual-pitch support 810. In a second position 850, as shown in FIG. 8B, and the second shoulder 842 of the protuberance 840 may be positioned against the second surface 820 of the dual-pitch support 810. The propeller blade 830 may be oriented at a first pitch angle in the first position 845 and a second pitch angle in the second position 850.

In an alternative embodiment (not shown), the at least one protuberance may include two protuberances, such that a first protuberance defines the first shoulder and the second protuberance defines the second shoulder. In a further embodiment, the first shoulder 841 may be configured to be removably coupled to the first surface 815 of the dual-pitch support 810 and the second shoulder 842 may be configured to be removably coupled to the second surface 820 of the dual-pitch support 810. In various embodiments, the removable couplings (not shown) may include detents and corresponding protrusions, magnets or electromagnets, compression couplings, among other possibilities.

IV. ILLUSTRATIVE METHODS

Figure 9:
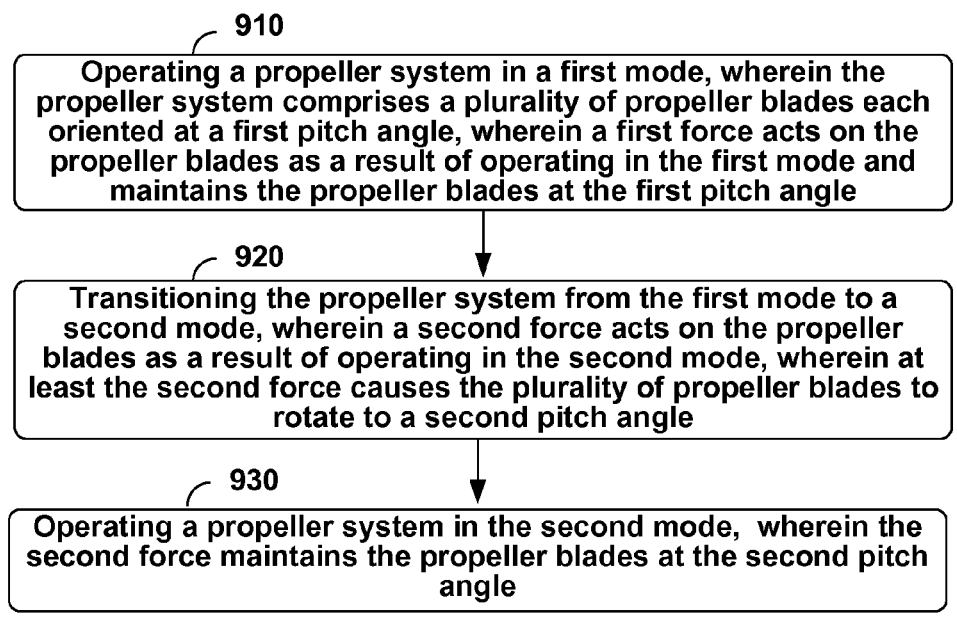
FIG. 9 is a flowchart of a method, according to an example embodiment.

FIG. 9 is a flow chart of a method, according to an example embodiment. Example methods, such as method 900 of FIG. 9, may be carried out by a pilot or a control system and/or by other components in communication with or disposed on an aerial vehicle. A control system may take the form of program instructions stored on a non-transitory computer readable medium and a processor that executes the instructions. However, a control system may take other forms including software, hardware, and/or firmware.

Example methods may be implemented as part of an aerial vehicle's flight plan. As shown by block 910, method 900 involves operating a propeller system in a first mode. The propeller system may include a plurality of propeller blades in accordance with the embodiments discussed in section III above. Each propeller blade may be oriented at a first pitch angle in the first mode. In a preferred embodiment, the first mode corresponds to a hover mode. In the first mode or hover mode, a first force acts on the propeller blades as a result of operating in the first mode and maintains the propeller blades at the first pitch angle. The first force may result from air pressure gradients or airflow, or inertial or centripetal loads, for example, as a result of operating in the hover mode. This first force may maintain the propeller blades at the first pitch angle by acting against the propeller blades and forcing the blade root, or a protuberance coupled to a blade root, against a first surface of a dual-pitch support. In addition, a detent or other mechanism or force may further assist in maintaining the propellers at the first pitch angle.

At block 920, the propeller system may transition from the first mode to a second mode. In a preferred embodiment, the second mode is a forward flight or power generation mode. As a result of operating in the second mode, a second force acts on the propeller blades. The second force, like the first force, may result from air pressure gradients or airflow or inertial or centripetal loads as a result of operating, for example, in the forward flight mode. This second force may cause the plurality of propeller blades to then rotate to a second pitch angle. Additionally, another force may assist the second force in rotating the blades.

At block 930, the propeller system operates in the second mode, and the second force maintains the propeller blades at the second pitch angle. This second force may maintain the propeller blades at the second pitch angle by acting against the propeller blades and forcing the blade root, or a protuberance coupled to the blade root, against a second surface of a dual-pitch support. In addition, a detent or other mechanism or force may further assist in maintaining the propellers at the second pitch angle.

In one embodiment, the propeller system may transition from the second mode to back to the first mode in order to land, for example. The first force then causes the plurality of propeller blades to rotate back to the first pitch angle, with or without assistance from another force In one embodiment, the method may further include generating a third force via a pulse of torque from a motor of the propeller system. This pulse of torque may also causes the plurality of propeller blades to rotate to a second pitch angle or back to the first pitch angle.

IV. CONCLUSION

The particular arrangements shown in the Figures should not be viewed as limiting. It should be understood that other embodiments may include more or less of each element shown in a given Figure. Further, some of the illustrated elements may be combined or omitted. Yet further, an exemplary embodiment may include elements that are not illustrated in the Figures.

Additionally, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

We claim:

1. An apparatus, comprising:
a rotor hub;
a dual-pitch support coupled to the rotor hub, wherein the dual-pitch support has a first surface, a second surface and a cavity defined between the first surface and the second surface; and
a propeller blade rotatably coupled to the rotor hub, wherein the propeller blade includes a blade root disposed within the cavity of the at least one dual-pitch support, wherein the blade root is movable, in the cavity, between a first position and a second position, a front face of the blade root moving against the first surface of the dual-pitch support and a back face of the blade root moving away from the second surface of the dual-pitch support when the blade root moves into the a first position, and the back face moving against the second surface and the front face moving away from the first surface when the blade root moves into the second position, wherein the propeller blade is oriented at a first pitch angle when the blade root is in the first position and is oriented at a second pitch angle when the blade root is in the second position, and wherein one of a protrusion or a detent is disposed on the dual-pitch support and the other of the protrusion or the detent is disposed on the blade root, the detent configured to engage the protrusion to hold the blade root in the first position or the second position until a threshold force is applied to the blade root.

2. The apparatus of claim 1, wherein the first pitch angle is lower than the second pitch angle.

3. The apparatus of claim 1, wherein the first pitch angle is within the range from about 15 degrees to about 164 degrees, wherein second pitch angle is within the range from about 16 degrees to about 165 degrees, and wherein the first pitch angle is lower than the second pitch angle.

4. The apparatus of claim 3, wherein the first pitch angle is about 20 degrees and the second pitch angle is about 25 degrees.

5. The apparatus of claim 1, wherein the at least one propeller blade is coupled to the rotor hub via a bearing.

6. The apparatus of claim 1, wherein the at least one propeller blade is coupled to the rotor hub via a ball and socket joint.

7. The apparatus of claim 1, wherein the front face of the blade root includes a convex surface and the first surface of the dual-pitch supports is reciprocally contoured to mate with the convex surface of the front face, and wherein the back face of the blade root includes a convex surface and the second surface of the dual-pitch support is reciprocally contoured to mate with the convex surface of the back face.

8. The apparatus of claim 1, wherein the first face and the front face are reciprocally contoured, and second face and the back face are reciprocally contoured.

9. The apparatus of claim 8, wherein the one of the protrusion or the detent is disposed on the first face of the dual-pitch support and the other of the protrusion or the detent is disposed on the front face of the blade root.

10. The apparatus of claim 8, wherein the one of the protrusion or the detent is disposed on the second face of the dual-pitch support and the other of the protrusion or the detent is disposed on the back face of the blade root.

11. The apparatus of claim 1, wherein the blade root rotates between the first position and the second position.

12. The apparatus of claim 1, wherein the blade root includes a cylindrical shaft portion and an eccentric portion, the cylindrical shaft portion coupled to the rotor hub, and the front face and the back face disposed on the eccentric portion.

13. The apparatus of claim 12, wherein the eccentric portion rotates about the cylindrical shaft portion between the first position and the second position.

14. The apparatus of claim 12, wherein the first face and the front face are reciprocally contoured, and second face and the back face are reciprocally contoured.

15. The apparatus of claim 12, wherein the one of the protrusion or the detent is disposed on the first face of the dual-pitch support and the other of the protrusion or the detent is disposed on the front face of the blade root.

16. The apparatus of claim 12, wherein the one of the protrusion or the detent is disposed on the second face of the dual-pitch support and the other of the protrusion or the detent is disposed on the back face of the blade root.

* * * * *